(12) United States Patent
Rivkin et al.

(10) Patent No.: US 8,867,128 B2
(45) Date of Patent: Oct. 21, 2014

(54) BINOCULAR SYSTEM

(75) Inventors: Maxim Rivkin, Newton, MA (US); Gintautas Narkevicius, Whitman, MA (US)

(73) Assignee: N-Vision Optics, LLC, Needham, MA (US)

( * ) Notice: Subject to any disclaimer, the term of this patent is extended or adjusted under 35 U.S.C. 154(b) by 0 days.

(21) Appl. No.: 13/317,098

(22) Filed: Oct. 7, 2011

(65) Prior Publication Data
US 2012/0200918 A1    Aug. 9, 2012

Related U.S. Application Data

(63) Continuation-in-part of application No. 12/931,555, filed on Feb. 4, 2011.

(51) Int. Cl.
G02B 23/00 (2006.01)
G02B 27/01 (2006.01)
G02B 23/12 (2006.01)
G02B 23/18 (2006.01)

(52) U.S. Cl.
CPC .......... *G02B 23/125* (2013.01); *G02B 27/0176* (2013.01); *G02B 2027/0132* (2013.01); *G02B 2027/0138* (2013.01); *G02B 23/18* (2013.01)
USPC .......................................... 359/409; 359/415

(58) Field of Classification Search
None
See application file for complete search history.

(56) References Cited

U.S. PATENT DOCUMENTS

| 4,449,787 | A | * | 5/1984 | Burbo et al. | ................... 313/524 |
| 5,128,807 | A | * | 7/1992 | Blackmon | ..................... 359/816 |
| 5,786,932 | A | | 7/1998 | Pniel | |
| 7,800,043 | B2 | * | 9/2010 | Filipovich et al. | ...... 250/214 VT |
| 2003/0218801 | A1 | * | 11/2003 | Korniski et al. | .............. 359/407 |

FOREIGN PATENT DOCUMENTS

| EP | 1 787 538 A1 | 5/2007 |
| WO | WO 2006/065805 A2 | 6/2006 |
| WO | WO 2007/002507 A2 | 1/2007 |

* cited by examiner

*Primary Examiner* — Derek S Chapel
(74) *Attorney, Agent, or Firm* — Muirhead and Saturnelli, LLC

(57) ABSTRACT

A binocular system includes a first monocular, a second monocular, a first arm coupled to a base plate via a first hinge and coupled to the first monocular, and a second arm coupled to the base plate via a second hinge and coupled to the second monocular. Each of the monoculars rotates about a corresponding one of the hinges along an axis of rotation that is not parallel to an axis of collimation of each of the monoculars. The monoculars are collimated when rotated into a deployed position. The binocular system may also include a mounting bracket coupled to the base plate, a tilt base, interposed between the mounting bracket and the base plate and a tilt lever, having a cam that is operatively engaged with the tilt base, where actuation of the lever causes the base plate to tilt with respect to the mounting bracket.

20 Claims, 31 Drawing Sheets

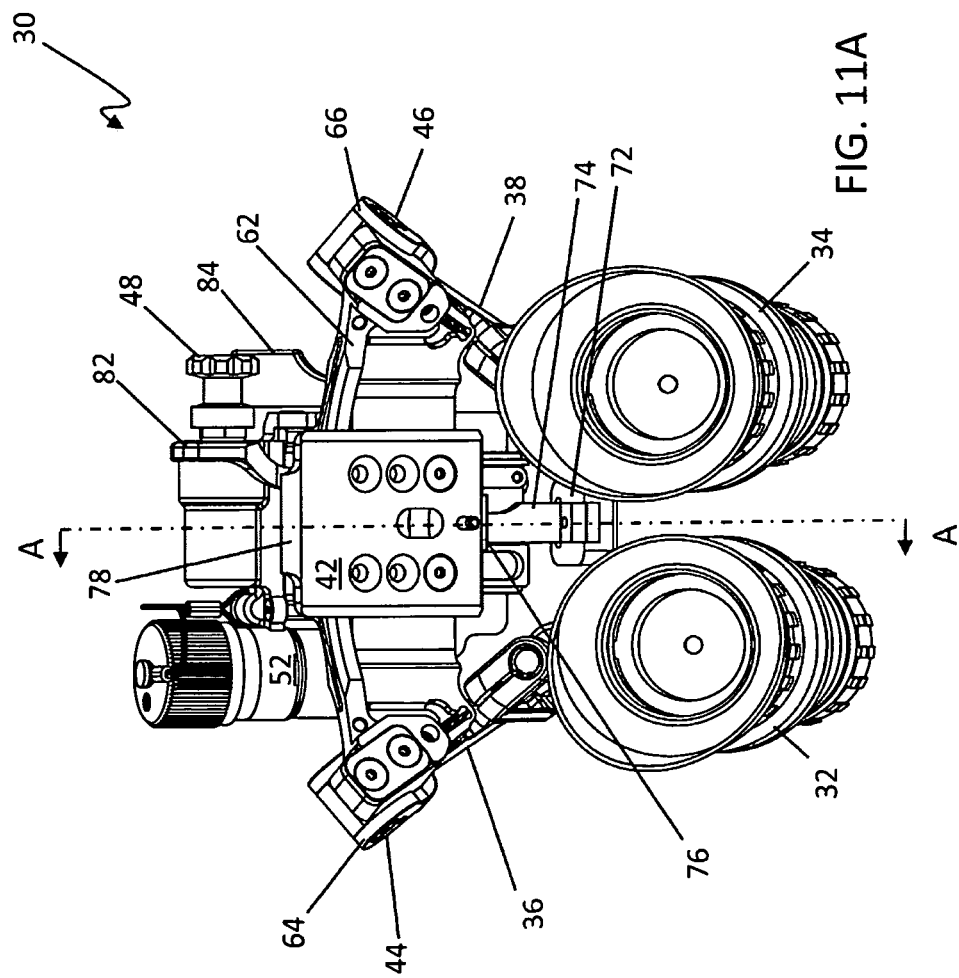

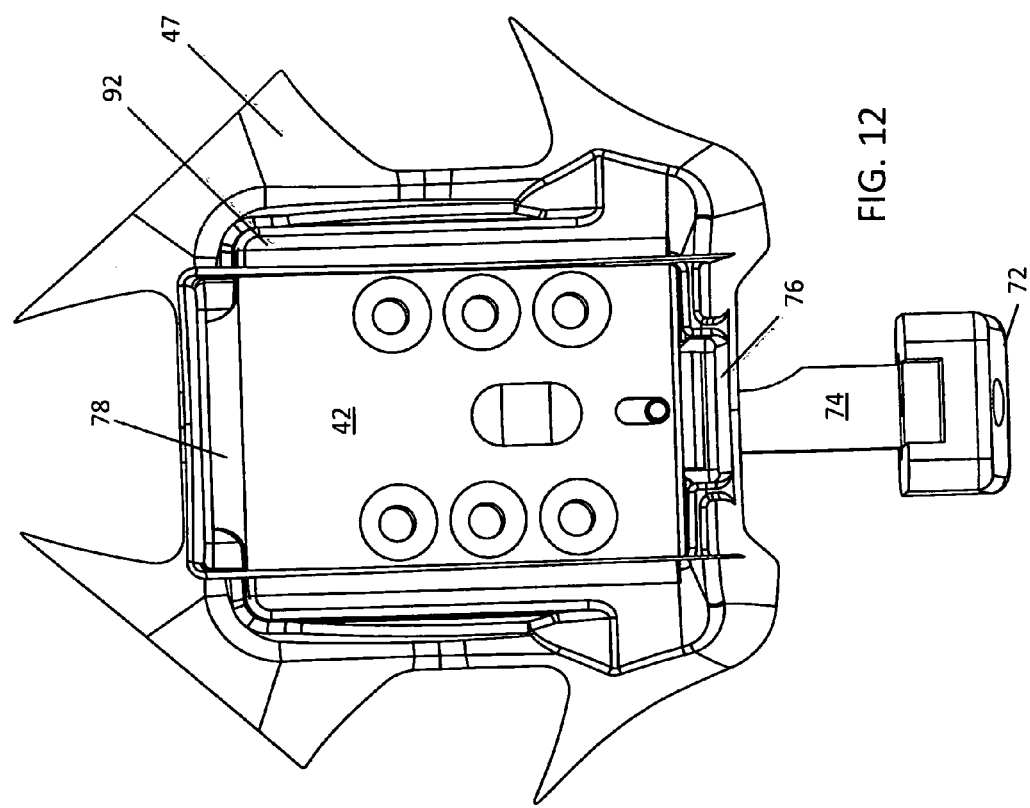

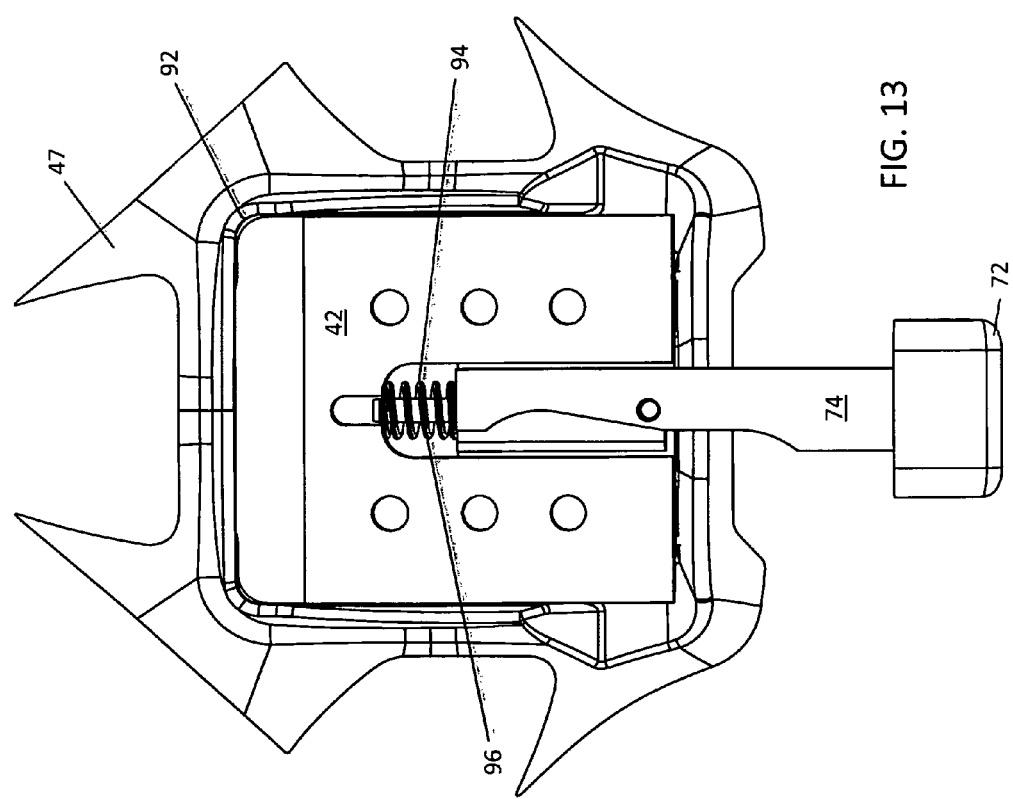

BINOCULAR SYSTEM

CROSS-REFERENCE TO RELATED APPLICATIONS

This application is a continuation-in-part of U.S. patent application Ser. No. 12/931,555 filed on Feb. 4, 2011 (pending), which is incorporated by reference herein.

BACKGROUND OF THE INVENTION

1. Technical Field

This application relates to the field of vision devices, and more particularly to the field of stereoscopic vision devices that are adjustable.

2. Description of Related Art

Conventional helmet mounted vision devices may be stored in a raised position when the devices are not being used. In such a position, the devices remain attached to the helmet, but are flipped vertically (stowed) so that the devices are significantly above the top of the helmet. This makes the wearer more visible, which may not be desirable in certain situations (e.g., in military situations). Additionally, such a configuration may make it difficult to move in some situations and may put unnecessary strain on a user when the components are in the flipped (unused or stowed) position, making the user physically uncomfortable.

One solution is to use lightweight components to reduce user strain. However, this does not address the problem of the devices being significantly above the user's head when flipped vertically in the unused (stowed) position. In addition, heavier components may be desirable for strength, reliability, etc., but not necessarily for improving optical properties. Accordingly, it may be possible to make higher performing optics by paying a weight penalty. However, relatively heavy components not only increase a user's physical discomfort when placed in a vertical (raised) position when not used, but may also be uncomfortable in the deployed position due to the weight and the position in front of the head that stresses the user's neck.

Thus, it is desirable to provide a binocular system that addresses the issues of the user becoming more visible when the components are flipped vertically in an unused (stowed) position as well as the user being uncomfortable when using relatively heavy components that are otherwise desirable for other performance considerations.

SUMMARY OF THE INVENTION

According to the system described herein, a binocular system includes a first monocular, a second monocular, a first arm coupled to a base plate via a first hinge and coupled to the first monocular, and a second arm coupled to the base plate via a second hinge and coupled to the second monocular. Each of the monoculars rotates about a corresponding one of the hinges along an axis of rotation of each of the hinges that is not parallel to an axis of collimation of each of the monoculars. The monoculars are collimated when rotated into a deployed position. The binocular system may also include a mounting bracket coupled to the base plate, a tilt base, interposed between the mounting bracket and the base plate and a tilt lever, having a cam that is operatively engaged with the tilt base, where actuation of the lever causes the base plate to tilt with respect to the mounting bracket. Tilting the monoculars may not change collimation thereof when deployed. The binocular system may also include a mounting bracket coupled to the base plate, a tilt base, interposed between the mounting bracket and the base plate, the tilt base having notches therein, a height adjustment lever having a portion that engages the notches of the tilt base and a spring that urges the height adjustment lever toward the notches, where disengaging the height adjustment lever from the notches allows for the height of the monoculars to be adjusted. Rotating each of the monoculars about a corresponding hinge thereof may cause each of the monoculars to be in an unused position. The system may be mounted on a helmet. Each of the monoculars placed in an unused position may be maintained below the top of the helmet. The binocular system may also include a first button provided on the first arm, where the first button locks the first arm in a deployed position and/or an unused position and a second button provided on the second arm, where the second button locks the second arm in a deployed position and/or an unused position. Each of the first and second buttons may include a button cam attached thereto, where the button cam urges a ball into a detent that is part of a corresponding one of the hinges. The binocular system may also include a first rail coupled to the first arm, a second rail coupled to the second arm, a first cam body attached to the first rail and to the first monocular, a first cam lever within the first cam body that causes a first slide block to frictionally engage the first rail, a second cam body attached to the second cam rail and to the second monocular, and a second cam lever within the second cam body that causes a second slide block to frictionally engage the second rail, where each of the rails rotates in a corresponding one of the arms to adjust inter pupillary distance for the monoculars independently of adjusting fore and aft positions of the monoculars by frictionally disengaging and then engaging the slide blocks using the cam levers. Each of the rails may have a flat portion that frictionally engages a corresponding one of the slide blocks. The binocular system may also include at least one plastic washer, interposed between one of the rails and a corresponding one of the arms. The binocular system may also include a battery compartment, a rotary switch, and an electronics compartment, coupled to at least one of: the battery compartment and the rotary switch, wherein the electronics compartment contains electronics that provide electrical signals to the monoculars. The binocular system may also include a first cable that provides electrical connection between the first monocular and the electronics compartment and a second cable that provides electrical connection between the second monocular and the electronics compartment, where the cables pass through corresponding ones of the hinges. The binocular system may also include a first reed switch that senses a magnet in the first arm and a second reed switch that senses a magnet in the second arm. Rotating each of the monoculars about a corresponding hinge thereof may cause each of the monoculars to be in an unused position and the reed switches may provide signals to the electronics indicating a position of a corresponding one of the arms. The binocular system may also include an external source, coupled to the binocular system, that provides an electronic signal thereto. The electronic signal may be a thermal image signal. The thermal image signal may be superimposed on a visual image provided by one of the monoculars. The thermal image signal may replace a visual image provided by one of the monoculars.

BRIEF DESCRIPTION OF DRAWINGS

Embodiments of the system are described with reference to the several figures of the drawings, noted as follows.

FIG. 11A is a schematic diagram illustrating a binocular system with a mounting bracket according to an embodiment of the system described herein.

FIG. 12 is a schematic diagram illustrating a mounting bracket and a mounting plate of a binocular system according to an embodiment of the system described herein.

FIG. 13 is a schematic diagram illustrating an alternative view of a mounting bracket and a mounting plate of a binocular system according to an embodiment of the system described herein.

DETAILED DESCRIPTION OF VARIOUS EMBODIMENTS

Figure 1:
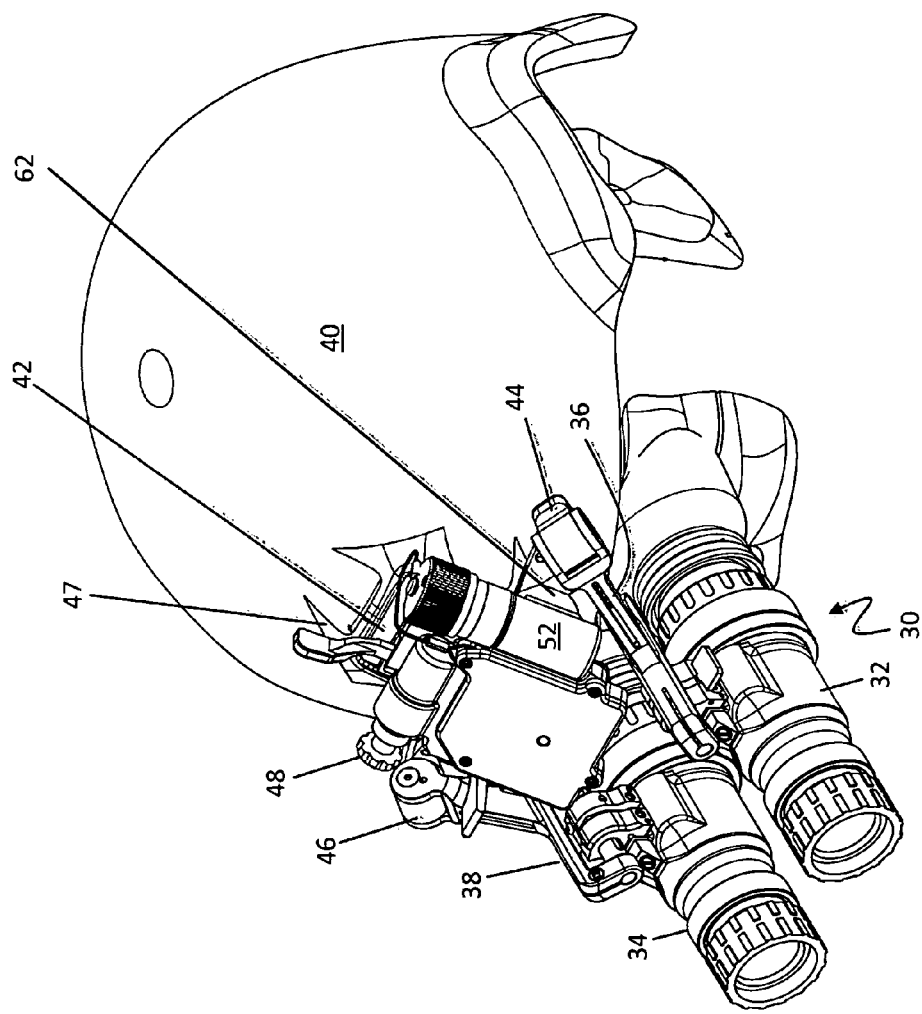
FIG. 1 is a schematic diagram illustrating a binocular system mounted on a helmet according to an embodiment of the system described herein.

Referring to FIG. 1, a binocular system 30 is shown attached to a helmet 40 that may be worn by a user. The binocular system 30 includes a first monocular 32 and a second monocular 34 that may be manipulated independently, as described in more detail elsewhere herein. The monoculars 32, 34 may be night vision devices, thermal imaging devices, conventional optical magnifying devices, electronic display devices that provide at least some visual information according to an electronic signal provided thereto (not illustrated in FIG. 1) and/or any device that provides useful visual information to a user. In some embodiments, it is possible for each of the monoculars 32, 34 to provide different types of visual information. For example, the monocular 32 could be a night vision device while the monocular 34 is a conventional optical magnifying device. In other embodiments, both of the monoculars 32, 34 are the same type of device, such as both being night vision devices. It is also possible for one or both of the monoculars 32, 34 to simultaneously provide different types of visual information therein. For example, the monocular 32 may provide conventional optical magnification with a corresponding thermal image superimposed thereon. In an embodiment herein, each of the monoculars 32, 34 includes a diopter adjustment. The binocular system 30 may be manufactured using any suitable material such as any of a number of different metals, alloys, plastics, etc. provided that the material provides suitable strength, flexibility, resistance to temperature variations, weight, etc. for the functionality described herein.

The monocular 32 is coupled to an arm 36 while the monocular 34 is coupled to an arm 38. The arm 36 is coupled to a hinge 44 to allow movement of the arm 36 while the arm 38 is coupled to a hinge 46 to allow movement of the arm 36. A mounting bracket 42 attaches to the helmet 40 via a mounting plate 47 that is fixedly attached to the helmet 40. In some embodiments, it is possible to not use the mounting plate 47 and have the mounting bracket 42 attach directly to the helmet 40 using any appropriate attachment mechanism, such as screws, bolts, glue, etc. In some embodiments, the mounting bracket 42 may be an integral part of the helmet 40 that is fixedly inserted when the helmet is manufactured. Note also that the mounting plate 47 may be any appropriate shape that can provide the functionality described herein and consistent with cost constraints and other considerations. The arms 36, 38, the hinges 44, 46, the bracket 42, and the mounting plate 47 are described in more detail elsewhere herein.

An optional rotary switch 48 and an optional battery compartment 52 (containing a battery, not shown in FIG. 1) may be used in instances where one or both of the monoculars 32, 34 are night vision devices. The rotary switch 48 and/or the battery compartment 52 may be attached to and/or part of a base plate 62. Note that components of the binocular system 30 are located relatively close to the helmet 40 (user's head), which generally provides a more optimal weight distribution that minimizes user discomfort. Note also that other types of switches, such as a pushbutton switch, may be used instead of the rotary switch 48.

Figure 2:
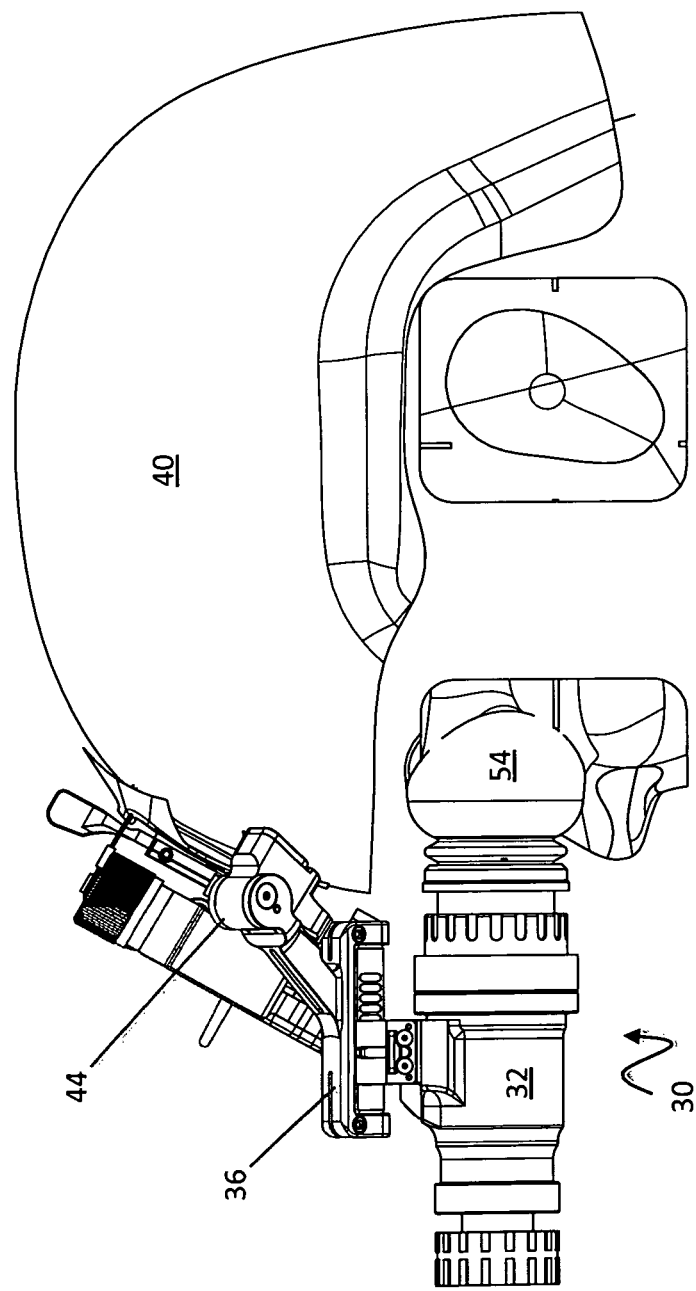
FIG. 2 is a schematic diagram illustrating a side view of a binocular system mounted on a helmet according to an embodiment of the system described herein.

Referring to FIG. 2, the binocular system 30 is shown from the side. The monocular 32 is shown as including an optional eye cups 54 that attaches to the eyepiece of the monocular 32 in order to make use more comfortable and prevent stray light coming from the eyepiece from shining on a user's face, thus making the user more easily detectable at night. The eye cups 54 may be especially useful in instances where the monocular 32 is a night vision device. However, the eye cups 54 may be useful in other instances. For example, the eye cups 54 may help prevent wind and/or foreign particles from entering a user's eye or shade bright side lights.

Figure 3:
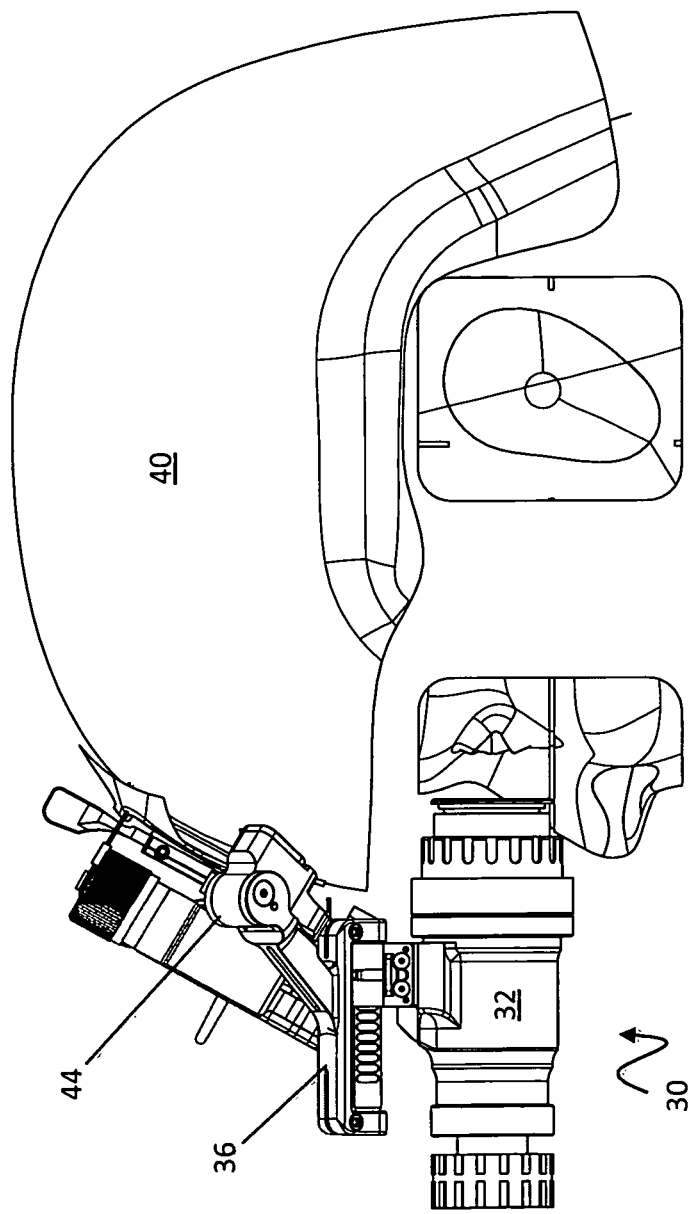
FIG. 3 is a schematic diagram illustrating an alternative embodiment, without eye cups, of a binocular system mounted on a helmet according to an embodiment of the system described herein.

Referring to FIG. 3, the binocular system 30 is shown without any eye cup. In some instances, an eye cup is not needed and/or not desirable. Even in instances where the monocular 32 is a night vision device, an eye cup may not be needed if, for example, being detected in the darkness in not a concern (e.g., search and rescue operations, use in aircraft, etc).

Figure 4:
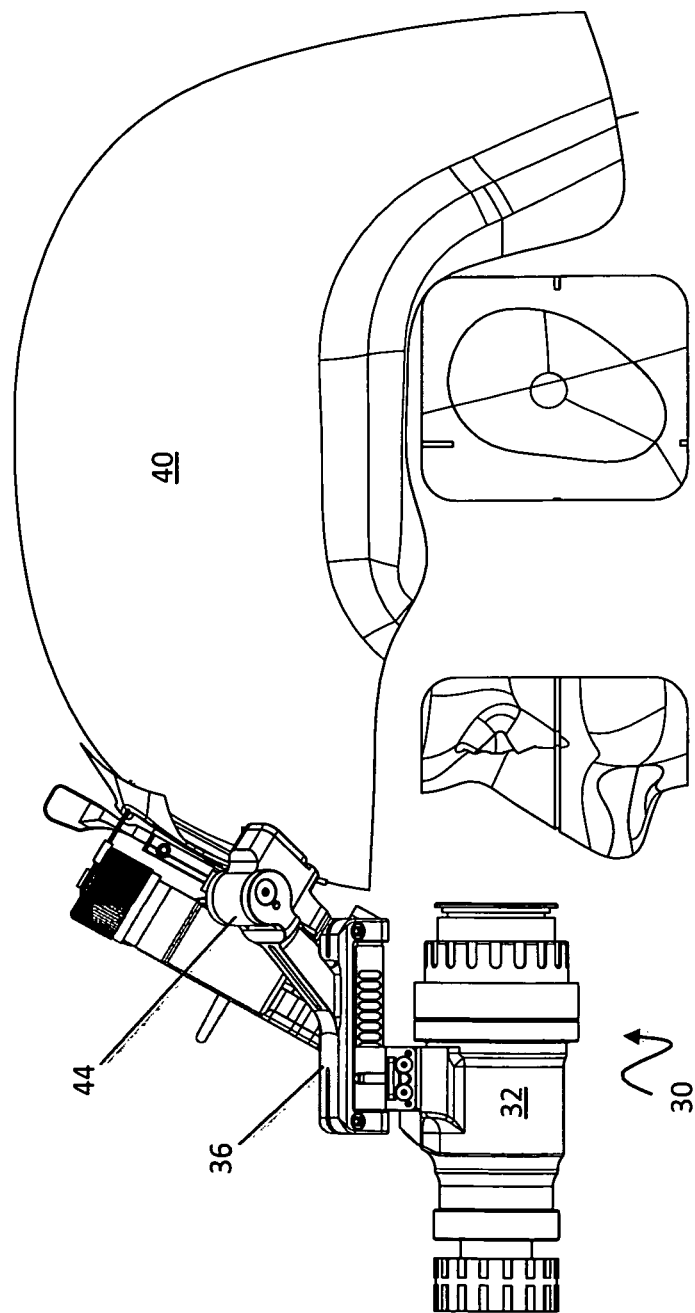
FIG. 4 is a schematic diagram illustrating positioning monoculars forward in a binocular system mounted on a helmet according to an embodiment of the system described herein.

Referring to FIG. 4, the binocular system 30 is shown with the monocular 32 provided in a forward most position. Note that the monoculars 32, 34 may be positioned fore or aft or any intermediate position independently of each other. Thus, positioning the monocular 32 in the forward position does not necessarily mean that the monocular 34 (not shown in FIG. 4) is also in the forward position. In an embodiment herein, the fore/aft adjustment for the monoculars 32, 34 may range from zero to 1.2 inches, although other ranges are possible. In other embodiments, the range may be different, such as from zero to 0.9 inches.

Figure 5:
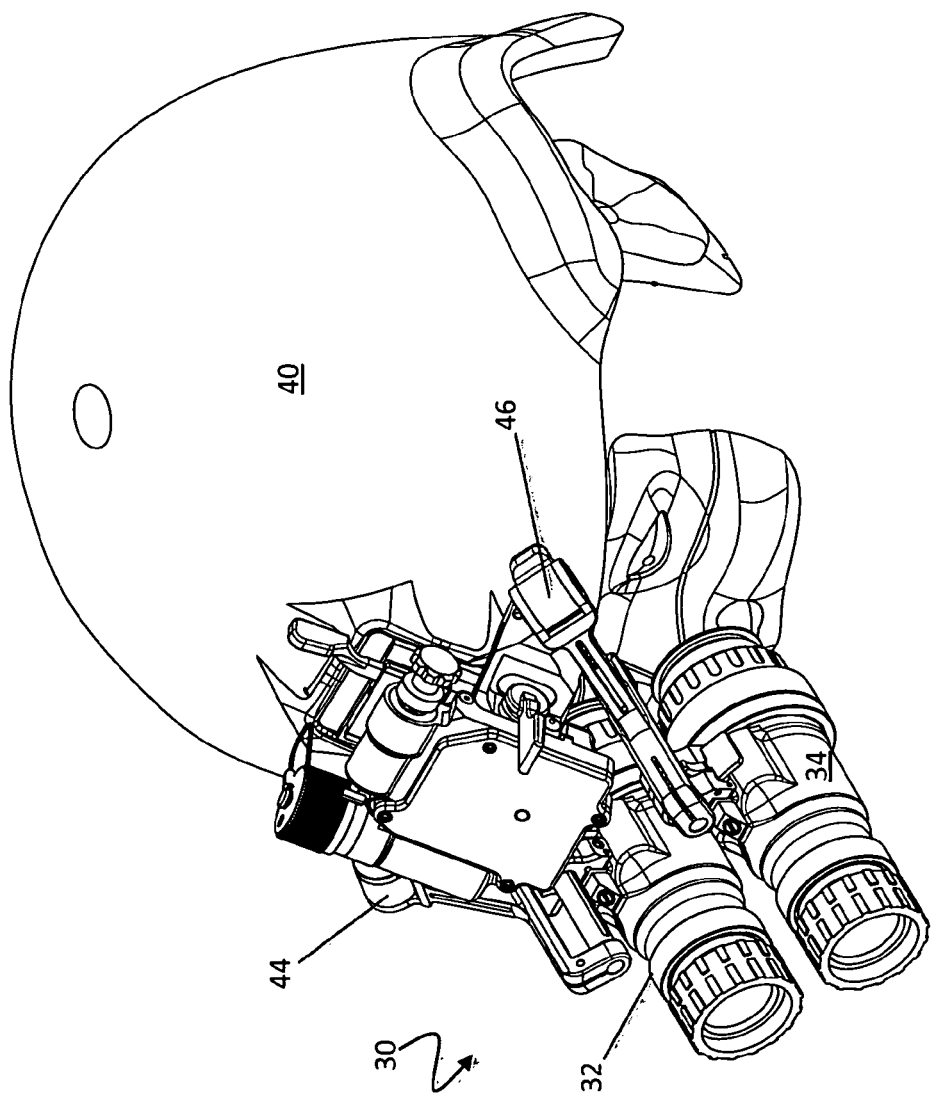
FIG. 5 is a schematic diagram illustrating positioning one monocular forward and one monocular aft in a binocular system mounted on a helmet according to an embodiment of the system described herein.

Referring to FIG. 5, the binocular system 30 is shown with the monocular 32 in the fore position while the monocular 34 is in the aft position. There are a number of reasons why a user may do this, including providing different images or possibly even different versions of the same image on each of the monoculars 32, 34.

Figure 6:
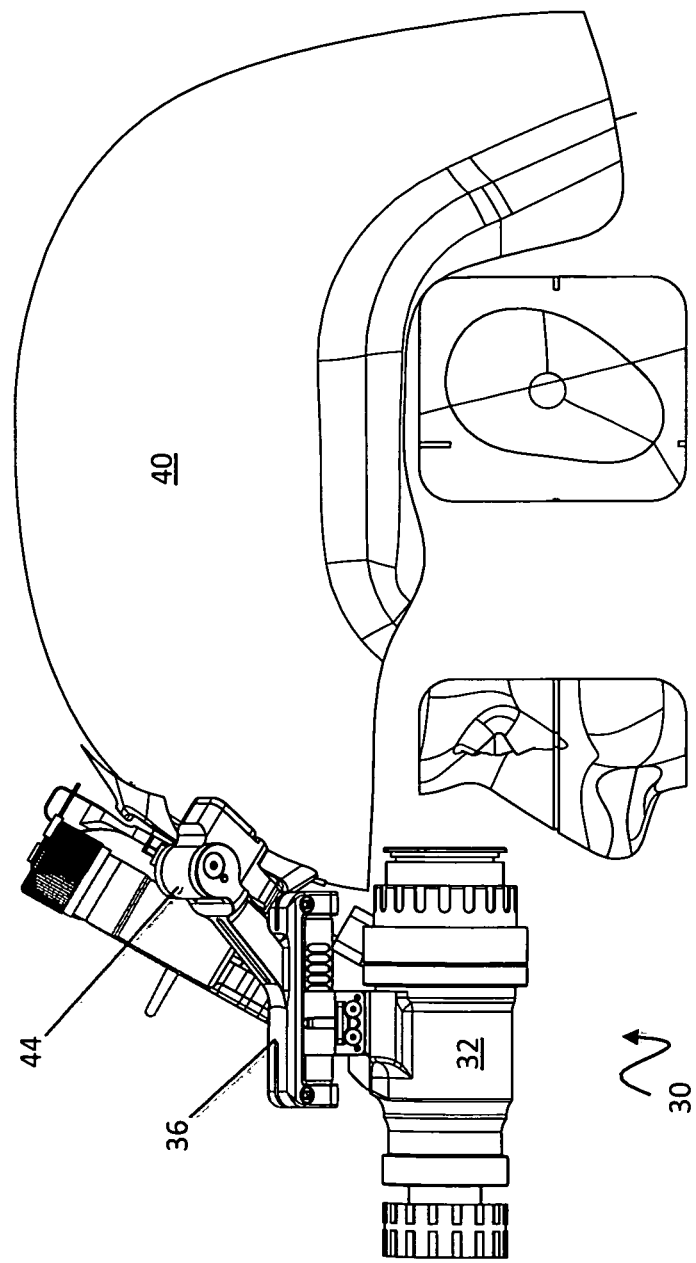
FIG. 6 is a schematic diagram illustrating lifting monoculars in a binocular system mounted on a helmet according to an embodiment of the system described herein.

Referring to FIG. 6, the binocular system 30 is shown with the monocular 32 lifted (i.e. raised closer to the front edge of the helmet 40). In an embodiment herein, both monoculars 32, 34 are raised and lowered in tandem so that the monocular 34 (not shown in FIG. 6) would be raised to the same height as the monocular 32. In other embodiments, it may be possible to raise and lower the monoculars 32, 34 independently of each other. In an embodiment herein, the height adjustment for the monoculars 32, 34 may range from zero to one inch, although other ranges are possible.

Figure 7A:
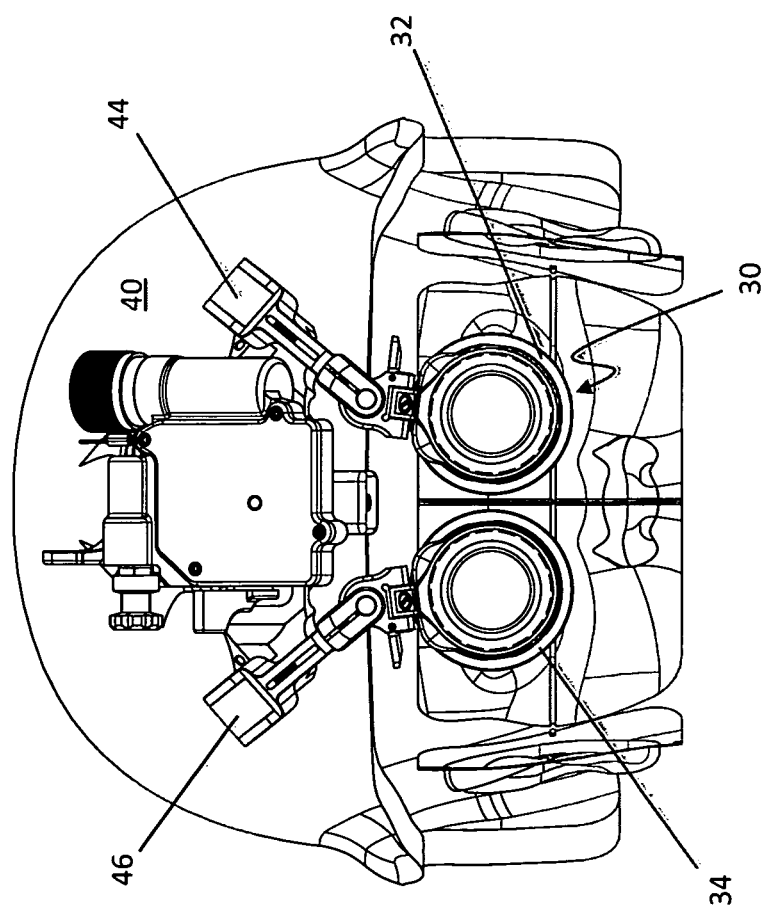
FIGS. 7A and 7B are schematic diagrams illustrating changing a distance between monoculars in a binocular system mounted on a helmet according to an embodiment of the system described herein.
Figure 7B:
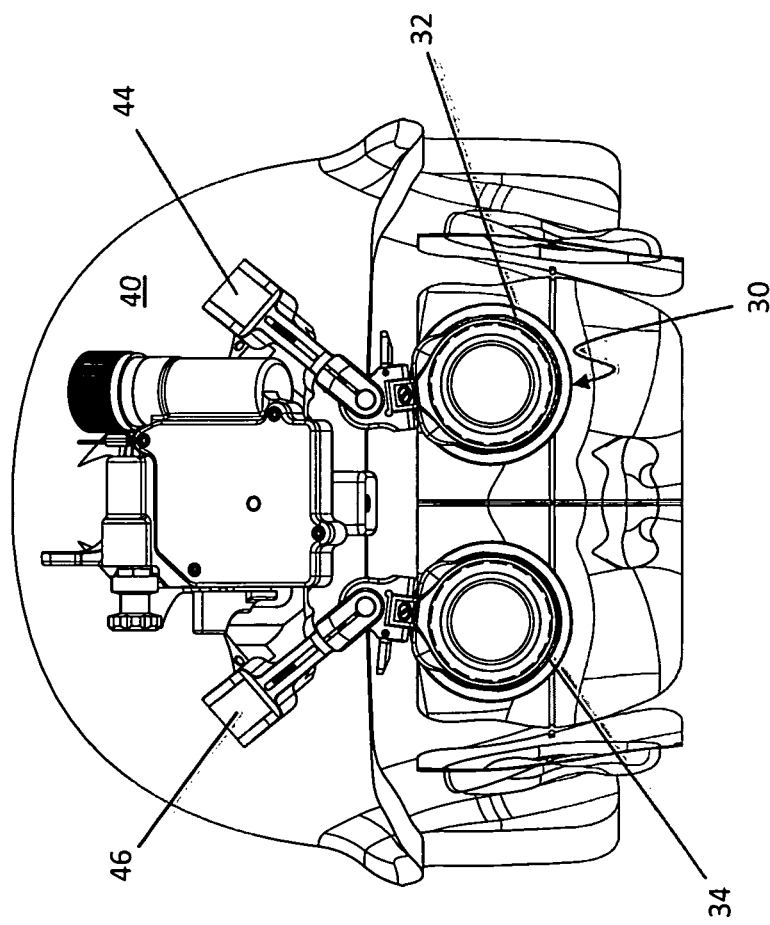

Referring to FIGS. 7A and 7B, the monoculars 32, 34 are shown with adjustments to the distance therebetween. In FIG. 7A, the monoculars 32, 34 are positioned relatively close together. In FIG. 7B, the monoculars 32, 34 are positioned relatively far apart. A user may adjust the distance between the monoculars 32, 34 for any number of reasons, including comfort and to account for the actual distance between the user's eyes. In an embodiment herein, the interpupillary distance adjustment for the monoculars 32, 34 may range from 50 mm to 75 mm, although other ranges are possible.

Figure 8A:
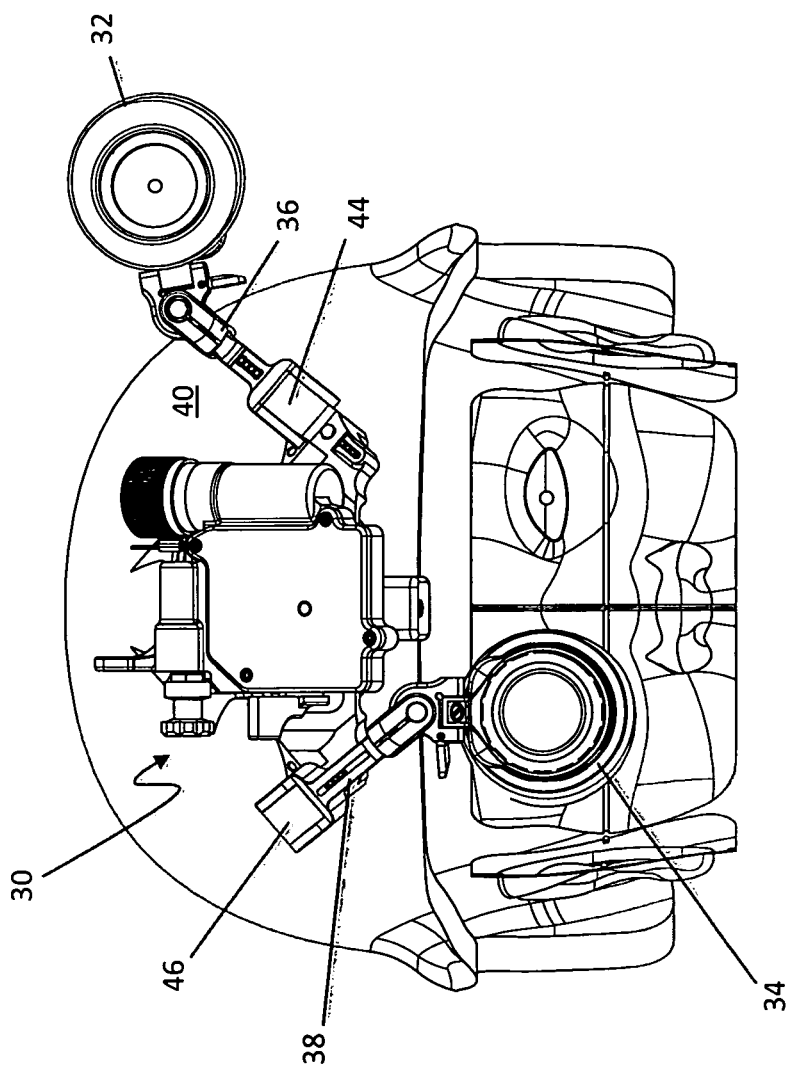
FIGS. 8A-8D are a schematic diagrams illustrating placing one of the monoculars in an unused (stowed) position in a binocular system mounted on a helmet according to an embodiment of the system described herein.
Figure 8B:
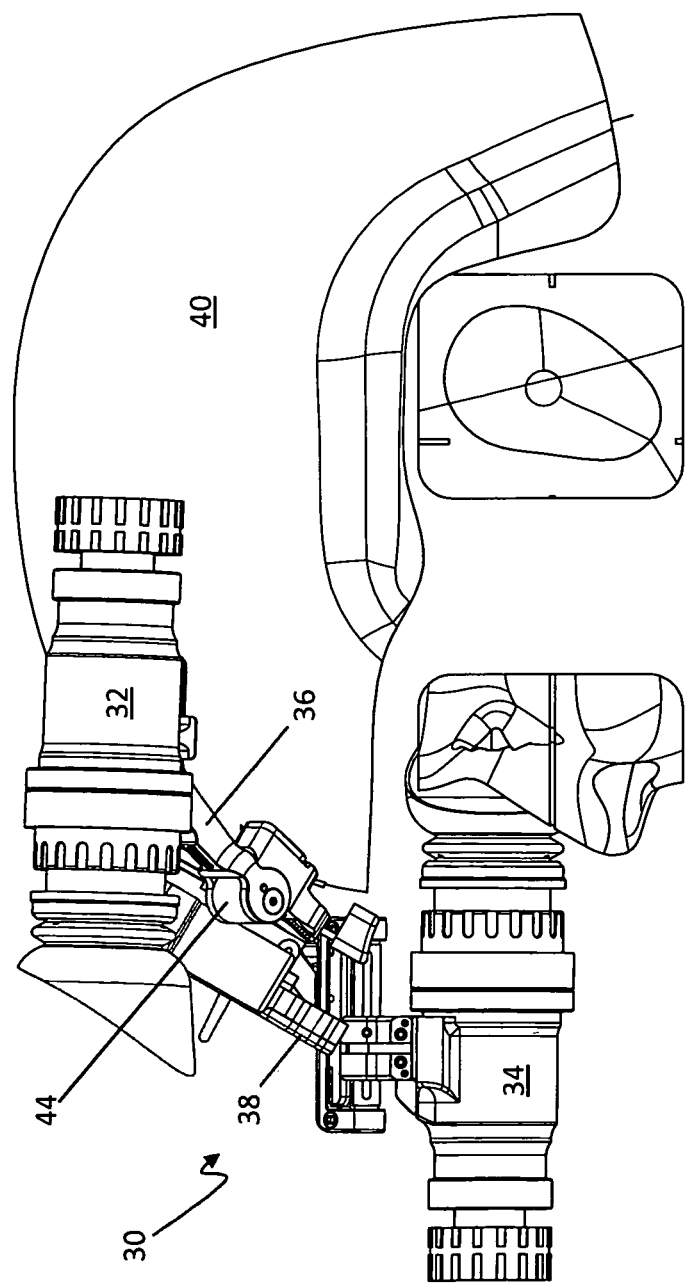
Figure 8C:
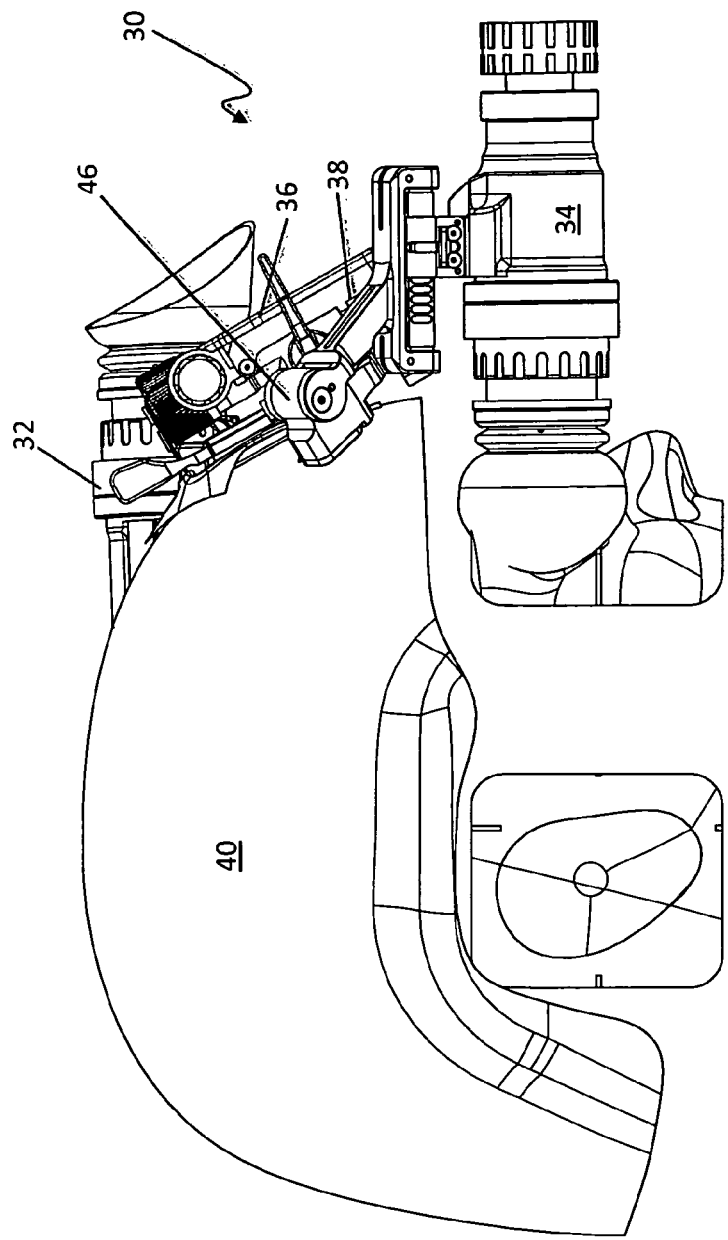
Figure 8D:
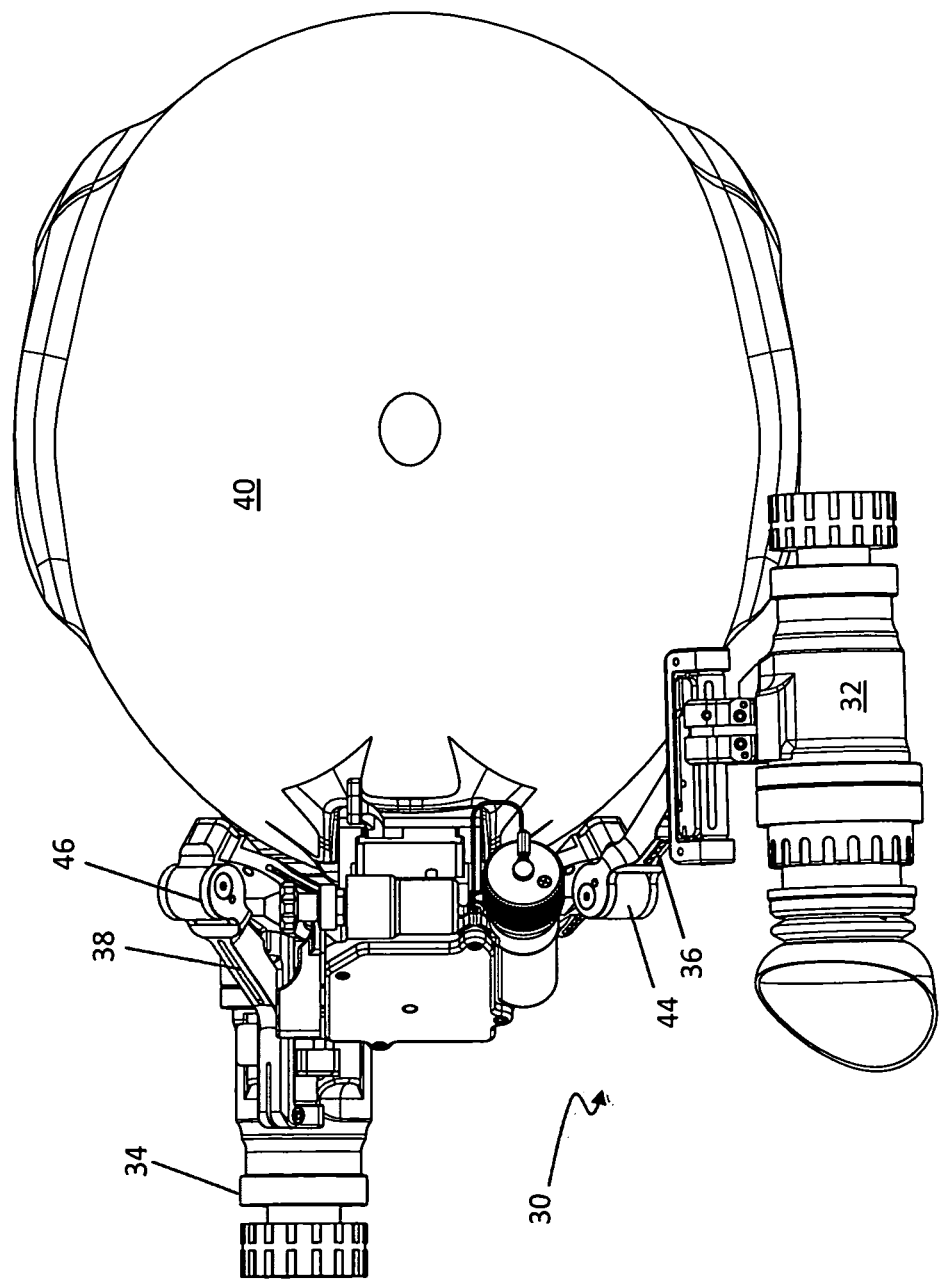

Referring to FIGS. 8A-8D, the binocular system 30 is shown with the monocular 32 flipped up (unused or stowed) while the other monocular 34 remains deployed (i.e., in front of the user's eye). The system 30 allows for either of the monoculars 32, 34 to be flipped up. In an embodiment herein, flipping up the monocular 32 causes the monocular 32 to rotate so that the normally forward portion thereof faces backward and vice versa. The monocular 32 may be flipped up by rotating the arm 36 about the pivot point of the hinge 44 with a single joint pivot mechanism. Each of the monoculars 32, 34 may independently rotates about a corresponding one of the hinges 44, 46 along an axis of rotation of each of the hinges that is not parallel to an axis of collimation of each of the monoculars 32, 34. The monoculars 32, 34 may be collimated when rotated into a deployed position. As shown in FIG. 8A and elsewhere, a transverse distance (side-to-side in FIG. 8A) between the arms 36, 38 is increased as each of the arms 36, 38 is rotated from a deployed position.

The arms 36, 38 may be provided at a substantially 50 degree angle with respect to the horizontal axis so as to facilitate the single joint pivot mechanism and to provide beneficial weight distribution of the components both in the deployed position and in the unused (stowed) position. Of course, the arms 36, 38 may be provided at a somewhat different angle with respect to the horizontal axis. The horizontal axis of the monocular 32 is substantially parallel to the ground and perpendicular to the direction of gravity when the user is standing and looking straight ahead (i.e., when the helmet 40 is upright).

Of course, other techniques/mechanisms may be used to configure the system 30 so that one of the monoculars 32, 34 is in front of the user's eye while the other one of the monoculars 32, 34 is not. There may be any number of reasons why a user may deploy only one of the monoculars 32, 34, including the desire to observe a scene both with the naked eye (no monocular) while viewing the same scene with the assistance provided by the monocular (e.g., night vision, thermal imaging, magnification, etc.).

Figure 9:
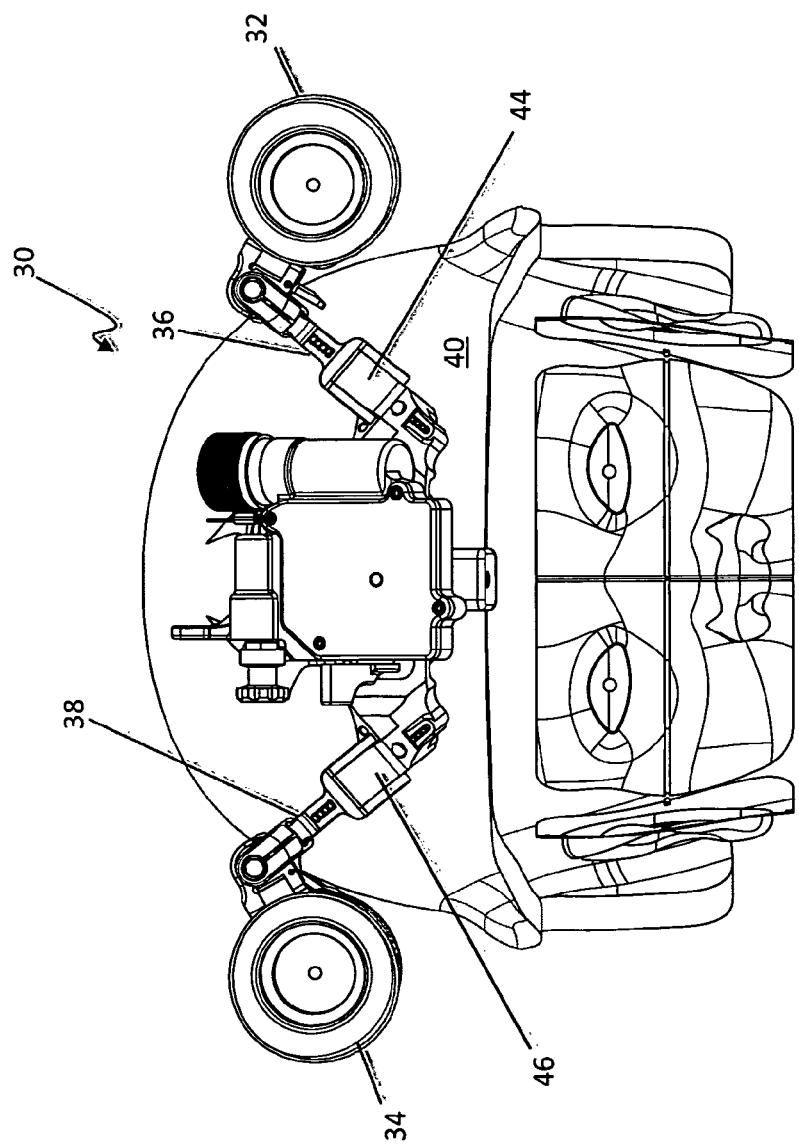
FIG. 9 is a schematic diagrams illustrating placing both of the monoculars in an unused (stowed) position in a binocular system mounted on a helmet according to an embodiment of the system described herein.

Referring to FIG. 9, the system 30 is shown with both of the monoculars 32, 34 stowed (unused). The monoculars 32, 34 may be flipped up in a manner similar to that illustrated in FIG. 8A-8D, which shows the monocular 32 being stowed. The user may flip up both of the monoculars 32, 34 in any number of situations. For example, if the monoculars 32, 34 are night vision devices, the user may flip up both monoculars 32, 34 if a scene being observed becomes lit. Note that, when in the raised (stowed) position, one or both of the monoculars 32, 34 do not extend above the top of the helmet 40. Thus, the system described herein provides a minimized profile when either or both of the monoculars 32, 34 are in the unused (stowed) position. Note also that the center of mass when the monoculars 32, 34 are in the stowed position is relatively close to the user's head, thus minimizing user discomfort. In other embodiments, one or both of the monoculars 32, 34 may extend at least partially above the top of the helmet 40.

In an embodiment herein, the binocular system 30 may include a mechanism for maintaining one or both of the monoculars in the deployed and/or in the unused position, such as a spring-loaded steel ball and corresponding holes provided in connection with the hinges 44, 46 where the ball is urged through one of the holes by the spring. Of course, any appropriate mechanism (e.g., a pin instead of a steel ball) may be used to maintain the monoculars 32, 34 in a deployed position and/or in an unused (stowed) position.

Figure 10A:
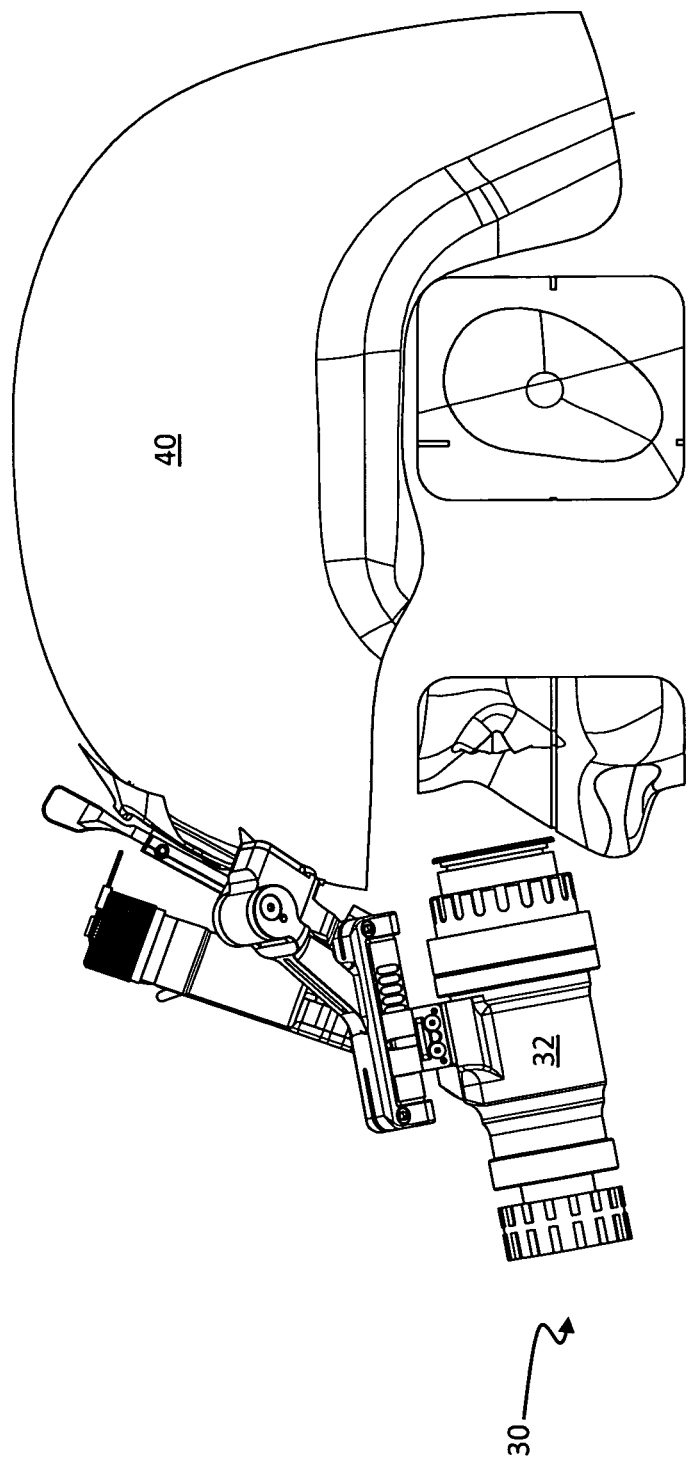
FIGS. 10A and 10B are a schematic diagrams illustrating tilting the monoculars in a binocular system mounted on a helmet according to an embodiment of the system described herein.
Figure 10B:
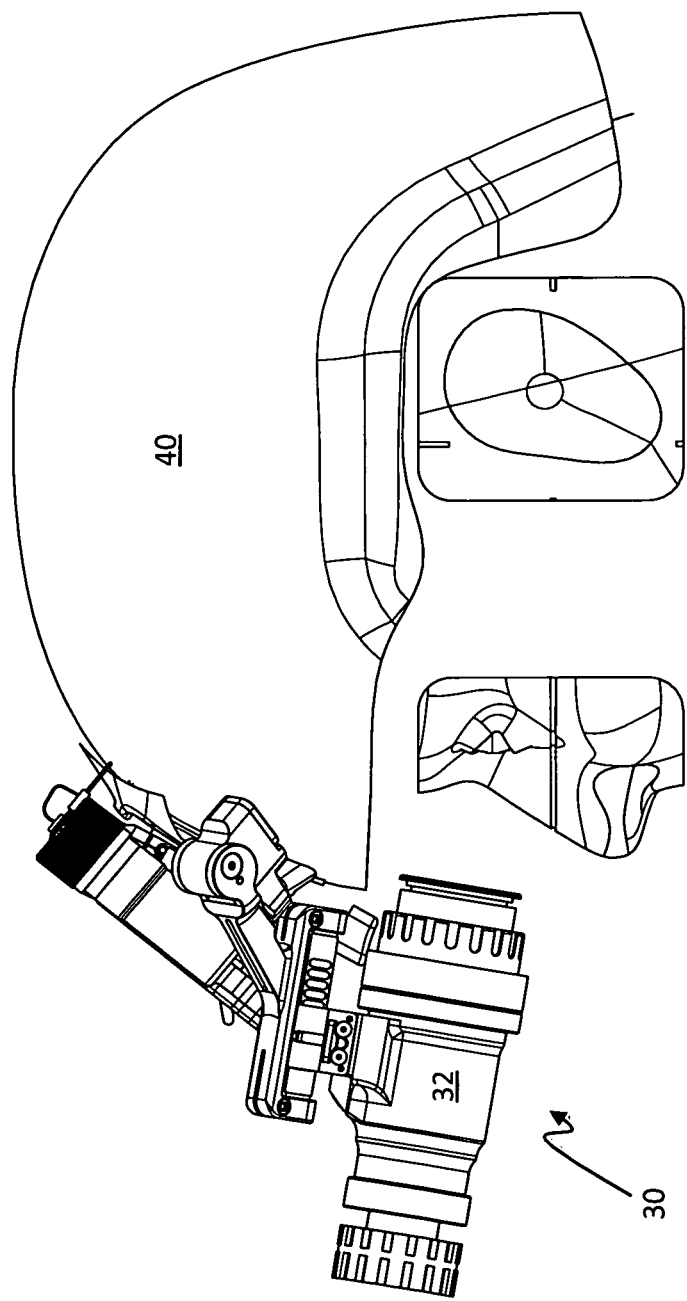

Referring to FIGS. 10A and 10B, the binocular system 30 is illustrated with the monocular 32 (and the monocular 34, not shown in FIGS. 10A and 10B) tilted down (in the case of FIG. 10A) or up (in the case of FIG. 10B). In an embodiment herein, the monoculars 32, 34 are tilted in tandem, although other configurations are possible. The mechanism for performing the tilting is described in more detail elsewhere herein. A user may tilt the monoculars for any number of reasons, including the desire to use the monoculars 32, 34 to comfortably observe a scene that is higher or lower than the user's head. In an embodiment herein, the tilt adjustment for the monoculars 32, 34 may range from minus ten to plus ten degrees, although other ranges are possible.

Referring to FIG. 11A, the binocular system 30 is shown in more detail without the helmet 40 and without the mounting plate 47. A base plate 62, which is coupled to the bracket 42 and to the hinges 44, 46, provides a first hinge portion 64 for the hinge 44 and provides a second hinge portion 66 for the hinge 46. In an embodiment herein, the base plate 62 is a single unitary piece. However, in other embodiments, the base plate 62 may be provided by more than one piece. The base plate 62 is discussed in more detail elsewhere herein. The hinges 44, 46 may including springs (not shown) or a similar mechanism to urge the monoculars 32, 34 into a particular position (e.g., a deployed position).

A helmet mount insert button 72 and a helmet mount insert slide 74 may be used to facilitate removing and attaching the binocular system 30 from and to a helmet. The helmet mount insert slide 74 includes a first lip 76 while the bracket 42 includes a second, opposing, lip 78. As described in more detail elsewhere herein, the lips 76, 78 engage the mounting plate 47 (not shown in FIG. 11) to attach the binocular system 30 to a helmet. The helmet mount insert slide 74 is spring actuated to urge the lips 76, 78 apart to maintain the binocular system attached to the helmet. A user may push on the helmet mount insert button 72 to urge the lips 76, 78 together to attach or detach the binocular system, as explained in more detail elsewhere herein.

The binocular system 30 also includes a height adjustment lever 82 that facilitates adjusting the height of the monoculars 32, 34 relative to the bracket 42, and thus relative to the user. Changing the height of the monoculars 32, 34 is illustrated, for example, in FIG. 6, discussed above. A user urges the height adjustment lever 82 toward the center of the binocular system (i.e., toward the left as shown in FIG. 11) to allow the user to raise or lower the monoculars 32, 34 by hand. Once the desired height is achieved, the user releases the height adjustment lever 82. Adjusting the height of the monoculars 32, 34 is discussed in more detail elsewhere herein.

Figure 11B:
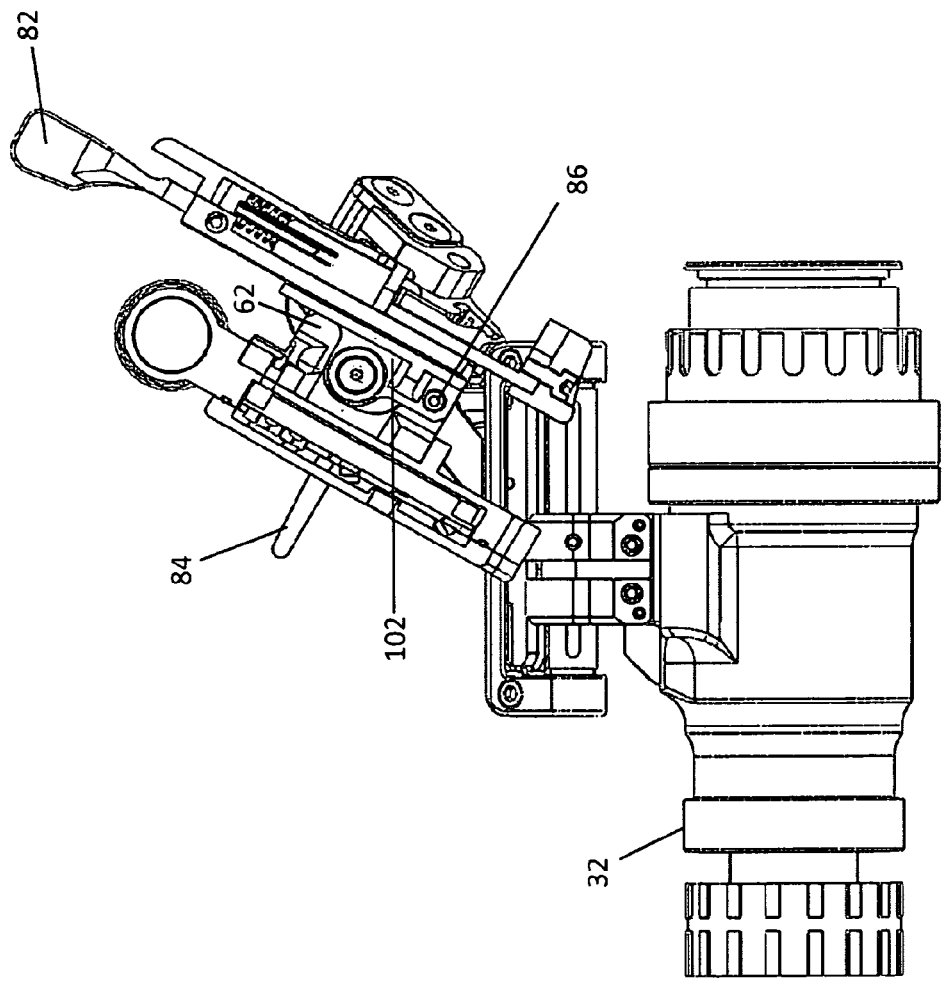
FIG. 11B is a cross-section A-A of the binocular system shown in FIG. 11A according to an embodiment of the system described herein.

Referring to FIG. 11B, the binocular system 30 also includes a tilt adjustment lever 84, which facilitates adjusting the tilt of the monoculars 32, 34, as illustrated, for example, in FIGS. 10A and 10B. A user adjusts the tilt of the monoculars 32, 34 by urging the tilt adjustment lever 84 in a somewhat circular motion to rotate the base plate 62 about the rivet 86 (and another similar rivet, not shown). Adjusting the tilt of the monoculars 32, 34 is discussed in more detail elsewhere herein.

Referring to FIG. 12, the mounting bracket 42 is shown in more detail with the mounting plate 47. The view of FIG. 12 is from the inside of the helmet 40 (not shown in FIG. 12) looking outward. The mounting plate 47 may be attached to the helmet 40 using any appropriate mechanism, including bolts, epoxy, rivets, straps, etc. In addition, the mounting plate 47 may be any shape that is effective to provide appropriate mounting thereof on the helmet 40. The mounting plate 47 may be mounted on headgear other than a helmet, such as a construction hardhat, a head mask, a head harness, etc. The mounting plate 47 may be integrated with and/or part of the helmet 40 (not shown in FIG. 12) and/or other headgear.

The mounting plate 47 has an opening 92 that accepts the mounting bracket 42. The distance between the lips 76, 78 is greater than the size of the opening when the helmet mount insert slide 74 is in the deployed position. When a user pushes on the helmet mount insert button 72 in a direction toward the lip 78, the lip 76 is urged in the direction of pushing so that the distance between the lips 76, 78 is decreased enough to insert the mounting bracket 42 into the opening 92 or to take the mounting bracket 42 out of the opening 92, as appropriate. Note that other attachment mechanisms are possible including, without limitation, providing a combination of one or more lips, cutouts, and/or notches on the mounting plate 47 that engages the mounting bracket 42 which may also include some combination of one or more lips, cutouts, and/or notches that are either similar to or different from those provided on the mounting plate 47.

Referring to FIG. 13, the mounting bracket 42 and the mounting plate 47 are shown in a direction from outside the helmet 40 (not shown in FIG. 13) looking in. A pin 94 is provided at an end of the helmet mount insert slide 74 to help guide the slide 74 to slide in a longitudinal direction. A spring 96 urges the slide 74 in a direction that increases the distance between the lips 76, 78 (not shown in FIG. 13). A user pushes on the helmet mount insert button 72 to compress the spring 96 and decrease the distance between the lips 76, 78 to facilitate inserting and extracting the mounting bracket 42 from the mounting plate 47.

Figure 14:
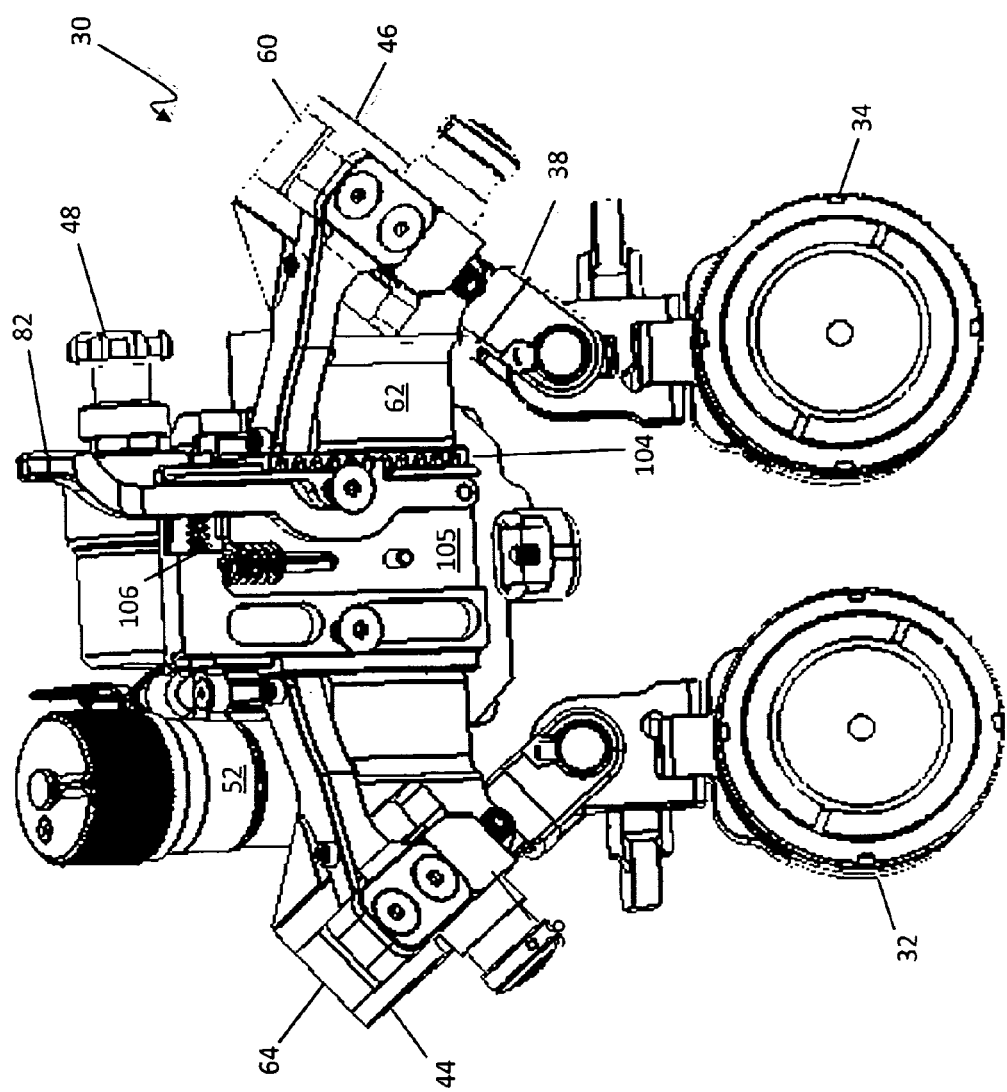
FIG. 14 is a schematic diagram illustrating a height adjustment mechanism of a binocular system according to an embodiment of the system described herein.

Referring to FIG. 14, the binocular system 30 is shown without any of the mounting bracket 42, the mount insert slide 74, etc. A tilt base 102 is coupled to the base plate 62, and is used to couple the mounting bracket 42 to the base plate 62. The tilt base 102 includes a plurality of notches 104 that are engaged by the height adjustment lever 82. The height adjustment lever 82 is attached at one end thereof to a height adjustment plate 105. A spring 106, which is coupled to the tilt base 102 and to the height adjustment lever 82, urges the height adjustment lever 82 toward the notches 104. A user adjusts the height of the monoculars 32, 34 by temporarily disengaging the height adjustment lever 82 from the notches 104, moving the monoculars 32, 34, base plate 62, tilt base 102, etc. by hand, relative to the height adjustment plate 105, and then releasing the height adjustment lever 82 so that the height adjustment lever 82 reengages the notches 104 at the desired height.

Figure 15:
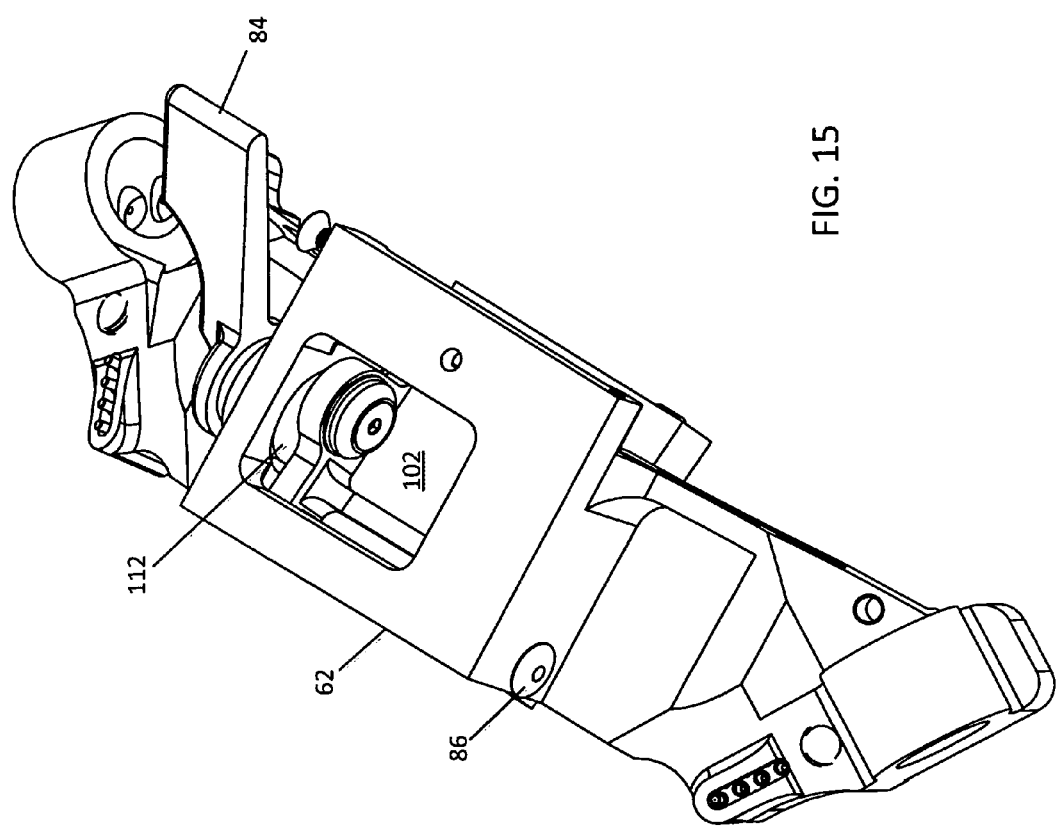
FIG. 15 is a schematic diagram illustrating a tilt adjustment mechanism of a binocular system according to an embodiment of the system described herein.

Referring to FIG. 15, the base plate 62 is shown in detail with the tilt base 102 and the tilt adjustment lever 84. The tilt adjustment lever 84 has a cam 112 attached to an end thereof that engages the tilt base 102. The tilt base 102 is pivotably coupled to the base plate 62 by the rivet 86 and an opposing rivet (not shown) that allow the base plate 62 to move in response to actuation of the tilt adjustment lever 84. An end of the tilt adjustment lever 84 rotates in a hole in the tilt base 102 and the cam 112 engages (pushes against) the base plate 62 to adjust the distance between the base plate 62 and the tilt base 102. In an embodiment herein, the tilt adjustment lever 84 and/or the tilt base 102 may maintain a particular position due to friction. Of course, any one or more other appropriate mechanisms may be used.

Figure 16:
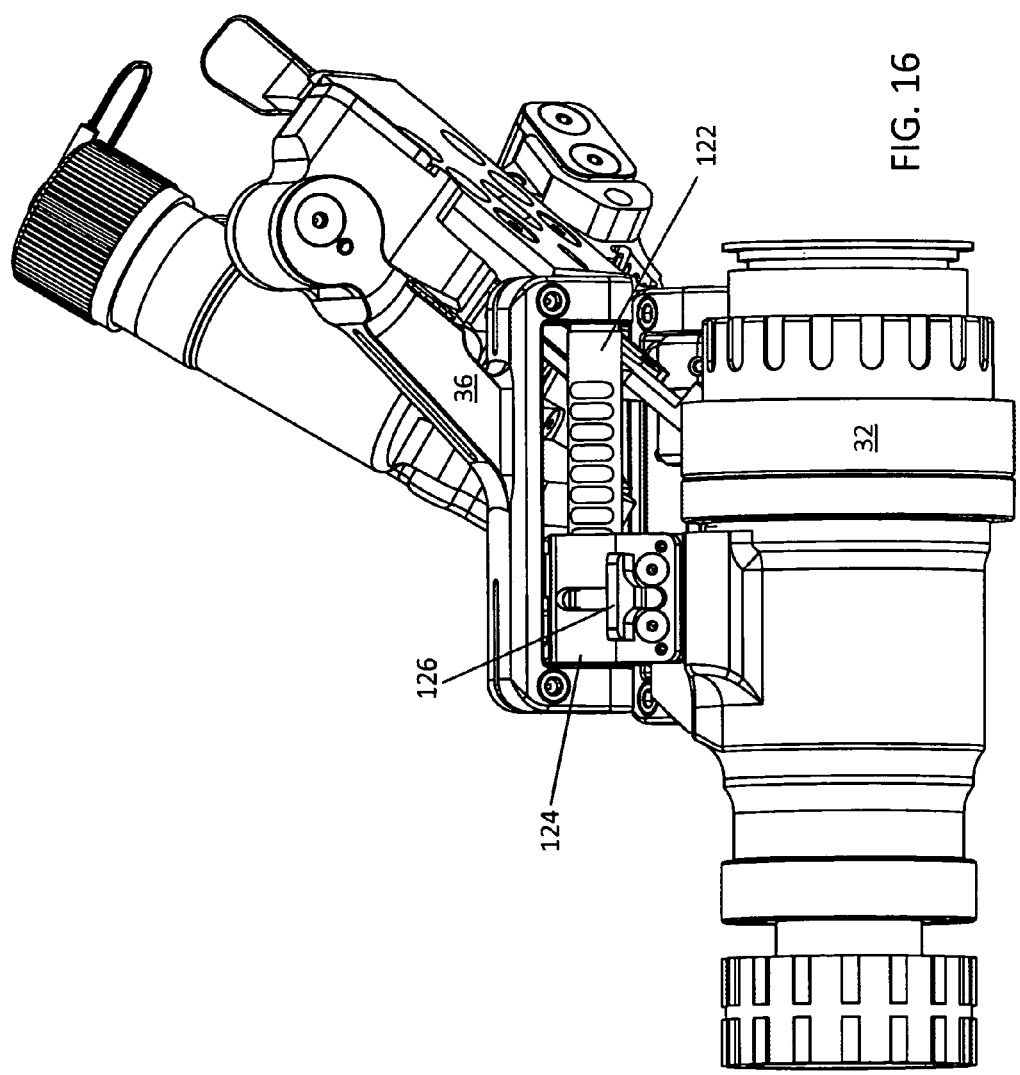
FIG. 16 is a schematic diagram illustrating a monocular attachment/adjustment mechanism of a binocular system according to an embodiment of the system described herein.

Referring to FIG. 16, the monocular 32 is attached to the arm 36 using a guide rail 122 and a slide block 124. The monocular 34 (not shown in FIG. 16) may be similarly attached. The slide block 124 may include a slide adjustment button 126. The slide block 124 is fixed to the slide rail 122 and engages notches therein when the slide adjustment button 126 is in an up position. When the slide adjustment button 126 is in a down position, the monocular 32 may be moved fore and aft (see discussion above in connection with FIGS. 4 and 5) and may be moved closer to or farther from the other monocular 34 (i.e., side to side, see discussion above in connection with FIGS. 7A and 7B). The slide adjustment button 126 may use friction engagement or any other appropriate technique (e.g., cam locks) to cause the slide block 124 to engage the guide rail 122.

Figure 17:
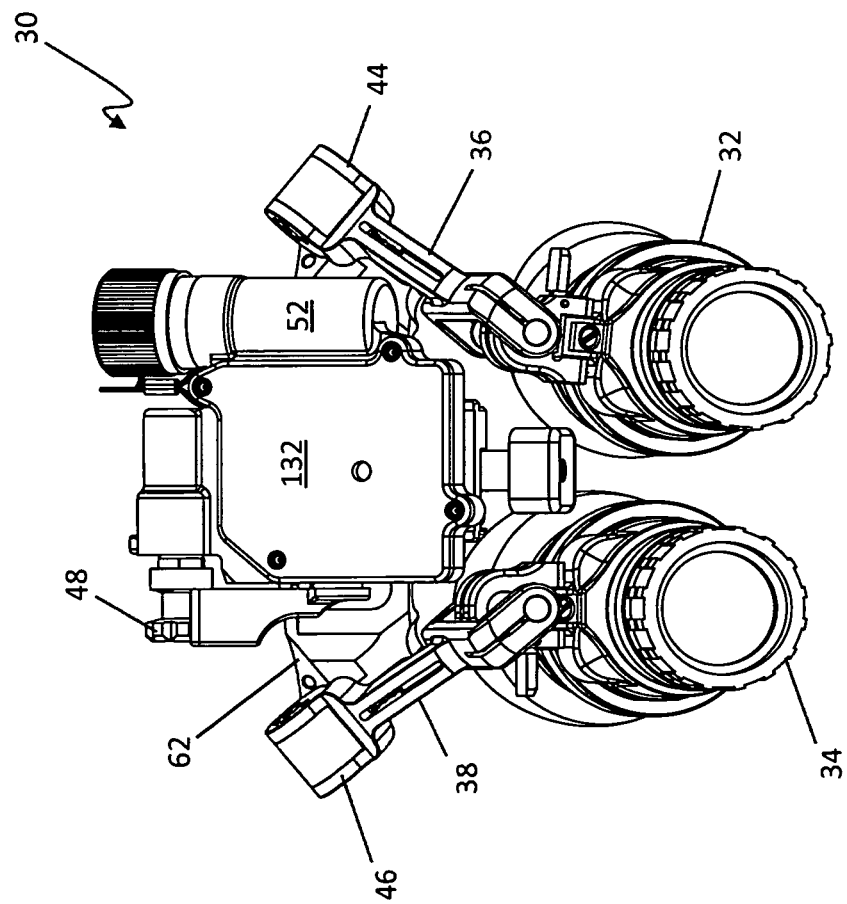
FIG. 17 is a schematic diagram illustrating a binocular system with a compartment for electronic components according to an embodiment of the system described herein.

Referring to FIG. 17, the binocular system 30 is illustrated from a front position (e.g., in front of where a user would be). In an embodiment herein, the monoculars 32, 34 may be conventional, commercially available oculars that are also provided on systems such as the AN/PVS-14 or AN/PVS-15 night vision devices. The binocular system 30 includes a compartment 132 that contains electronics therefor (not shown), such as a PCB board containing electronic components that provide night vision functionality. A battery (not shown) provided in the battery compartment 52 provides power to the electronics, which may be turned on and off using the rotary switch.

In an embodiment herein, the battery may be replaced by opening the battery compartment 52. In some embodiments, it may be possible to use an external power source in addition to, or instead of, a battery. It may be possible to provide a mechanism, such as a microswitch or similar, that turns off each of the monoculars 32, 34 when the monoculars 32, 34 are placed in a stowed position.

Figure 18:
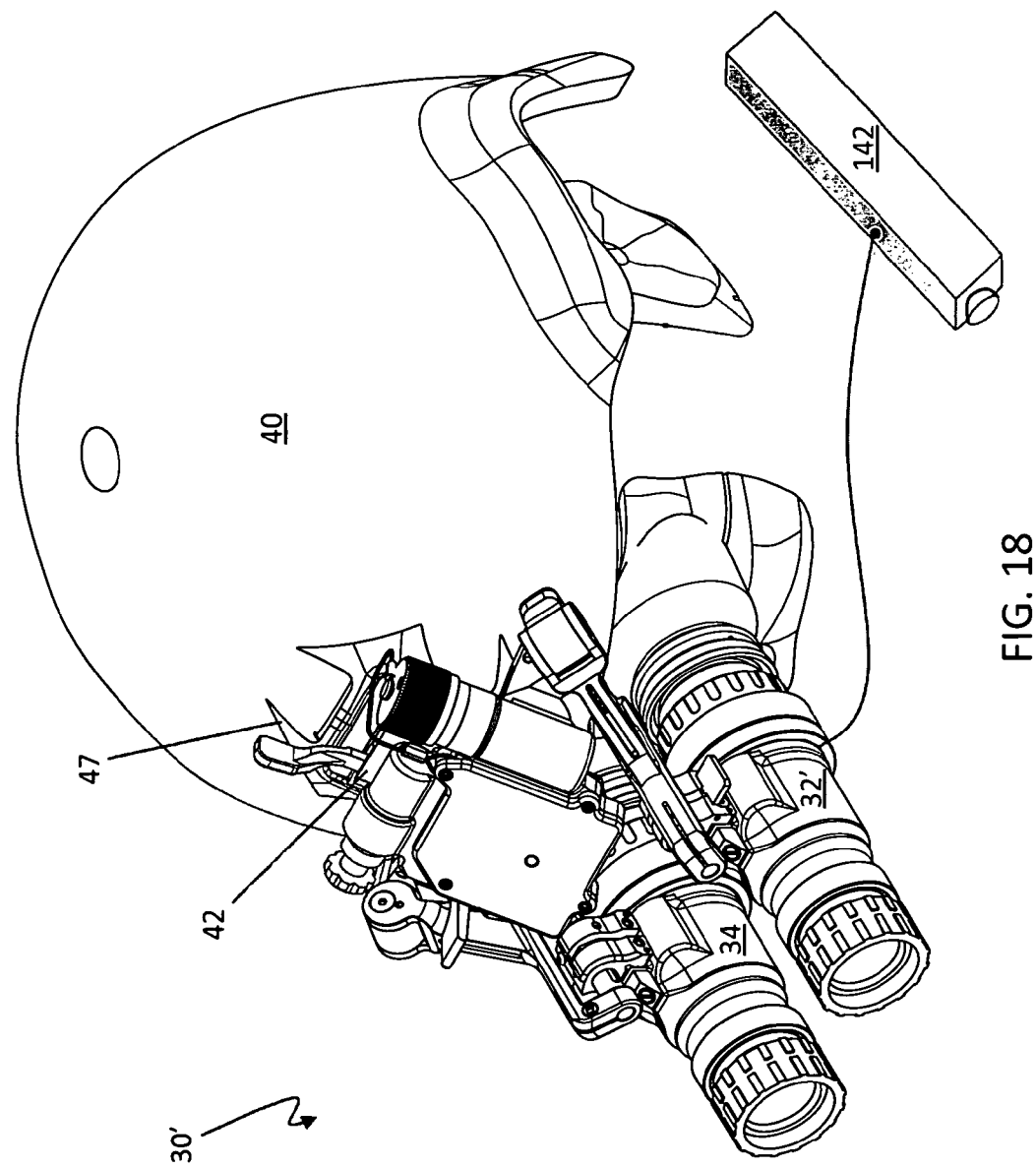
FIG. 18 is a schematic diagram illustrating a binocular system with an external source according to an embodiment of the system described herein.

It is useful to provide collimation of the monoculars 32, 34 to avoid double vision and/or headaches and stress that result from viewing non-collimated stereoscopic images. In an embodiment herein, the monoculars 32, 34 are collimated to less than one degree of convergence and less than 0.3 degrees of dipvergence/divergence. Note that all of the movements for the monoculars 32, 34 provided herein maintain the collimation of the monoculars. Thus, for example, the monoculars 32, 34 may be moved fore and aft and side to side without changing the collimation therebetween. Similarly, the monoculars 32, 34 may (also) be tilted and/or lifted without changing the collimation therebetween. Optical collimation may be provided using any appropriate mechanism, such as set screws (not shown) provided in the base plate 62 under the arms 36 and 38 between the hinges 44, 46 and any electrical connectors that are adjusted to move the monoculars 32, 34 independently in one dimension. In addition, the monoculars 32, 34 may be independently tilted up or down in using the slide block (not shown in FIG. 17) and (and a corresponding other slide block) by providing adjustment in another dimension. It is also possible to add shim components inside of the slide block (and a corresponding other slide block) to ensure good collimation Referring to FIG. 18, an alternative binocular system 30' is shown with an external source 142 that provides an electronic or optical signal to an alternative monocular 32' and or possible a second alternative monocular (not shown in FIG. 18) that has been modified to accept and process the electronic signal and/or overlapping optical image. The external source may be another night vision camera, a thermal imaging device, a conventional video camera, etc. The monocular 32' may accept and display the electronic signal as a single image or may superimpose an image corresponding to the electronic signal onto another image otherwise provided by the monocular 32'. For example, the monocular 32' may be a night vision device and the source 142 may be a thermal imaging camera. The user may then see a night vision image superimposed with the thermal image or may see the thermal image only. The images may be switchable so that the user can switch between a night vision image provided by the monocular 32 and the thermal image provided by the source 142.

The source 142 may be mounted anywhere, including on top of the helmet 40, the compartment 132 (shown in FIG. 17), or may be held by the user. The source 142 may even be separate from the user (e.g., held by another user, mounted on a vehicle, etc.). The signal may be provided from the source 142 to the system 30' using a conventional electrical and/or fiber optical connection, as shown, or may use any other appropriate signal transmission techniques, such as wireless Bluetooth transmission. Note also that the source 142 may provide any type of visual information, such as text, graphics, etc.

Figure 19:
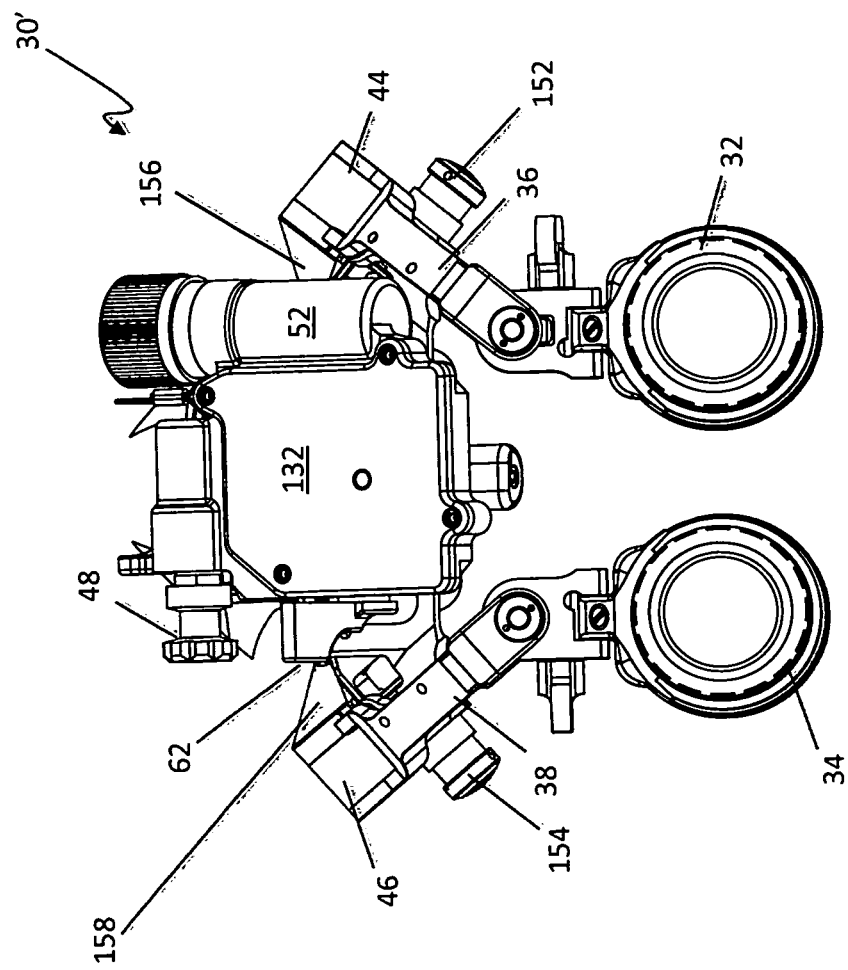
FIG. 19 is a schematic diagram illustrating a binocular system with pushbuttons for locking arms according to an embodiment of the system described herein.

Referring to FIG. 19, an alternative embodiment 30' of the binocular system is shown with a first locking button 152 and a second locking button 154. The first locking button 152 may be used to maintain the monocular 32 in a deployed position and/or in a stowed position while the second locking button 154 may be used to maintain the monocular 34 in a deployed position and/or in a stowed position. In an embodiment herein, the locking buttons 152, 154 may each include a mechanism to inhibit a corresponding one of the hinges 44, 46 from rotating unless the appropriate one of the buttons 152, 154 is pressed. Thus, the monocular 32 may be maintained in a deployed position or be maintained in a stowed position unless the button 152 is pressed to allow rotation of the hinge 44. Similarly, the monocular 34 may be maintained in a deployed position or be maintained in a stowed position unless the button 154 is pressed to allow rotation of the hinge 46.

The alternative embodiment 30' also shows a first cable cover 156 attached to the base plate 62 and a second cable cover 158 attached to the base plate 62. Use of the cable covers 156, 158 is described in more detail elsewhere herein.

Figure 20:
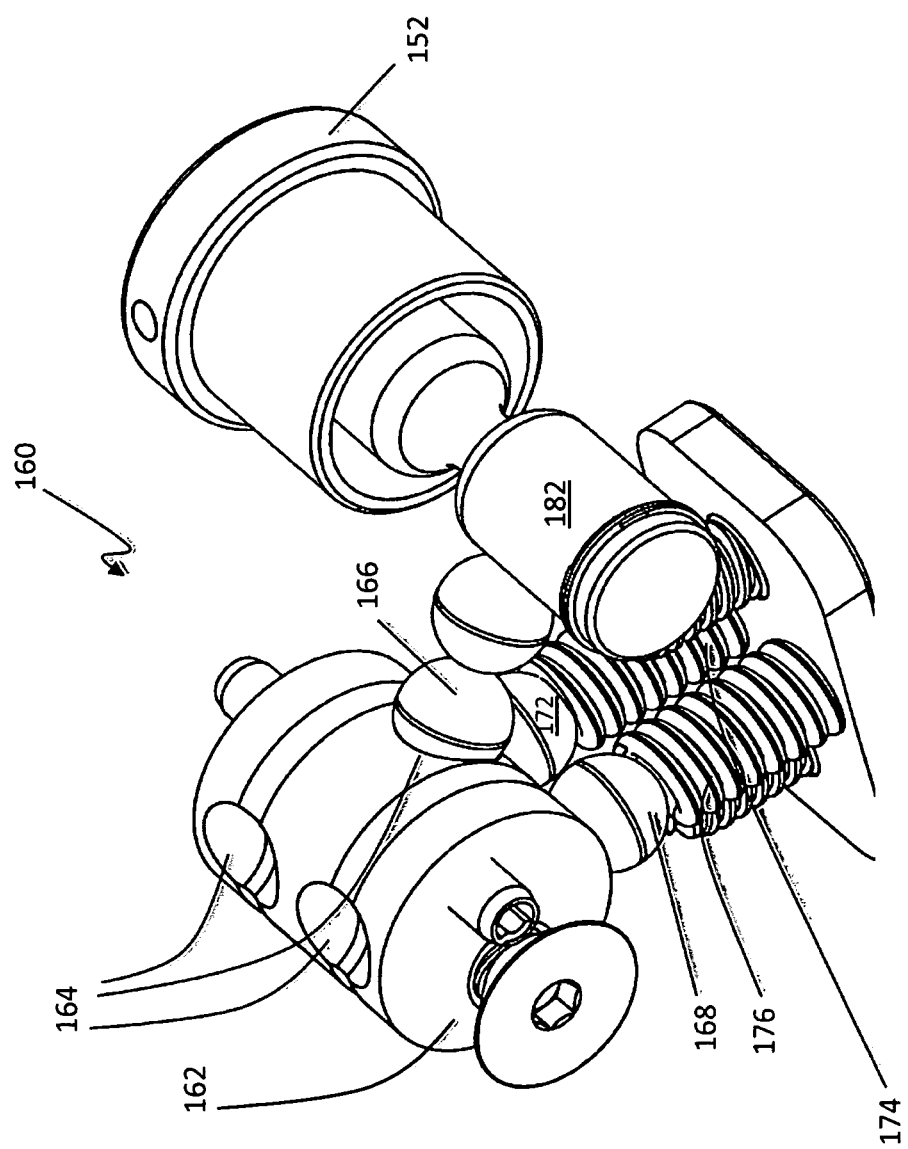
FIG. 20 is a schematic diagram illustrating in detail an arm-locking mechanism for a binocular system according to an embodiment of the system described herein.

Referring to FIG. 20, a diagram 160 shows the button 152 as well as a hinge pin 162 for the hinge 44. The hinge pin 162 is attached to the arm 36 (not shown in FIG. 20). The hinge pin 162 includes a plurality of detents 164, only some of which are visible in the diagram 160. Each of the detents 164 engage one of a plurality of balls 166, 168, 172 to inhibit rotation of the hinge pin 162. The balls 168, 172 are urged toward the hinge pin 162 using a pair of springs 174, 176. Some of the detents 164 correspond to the balls 168, 172 so that the hinge pin 162 can be held in two positions: a first position corresponding to the corresponding monocular 32 (not shown in FIG. 20) being used and a second position corresponding to the monocular 32 being stowed.

The ball 166 may be used to lock the position of the hinge pin 162 so that the corresponding monocular is locked in either the stowed or the used position. A button cam 182 is attached to the button 152. The button cam 182 has an irregular shape so that when the button 152 is in a first position (i.e., the position shown in FIG. 20), the ball 166 is constrained from moving perpendicularly with respect to the hinge pin 162. On the other hand, when the button 152 is pushed inward, a thinner portion of the button cam 182 allows the ball 166 to move perpendicularly with respect to the hinge pin 162 so that the hinge pin becomes rotatable. Note that a similar configuration may be provided for the button 154.

Figure 21:
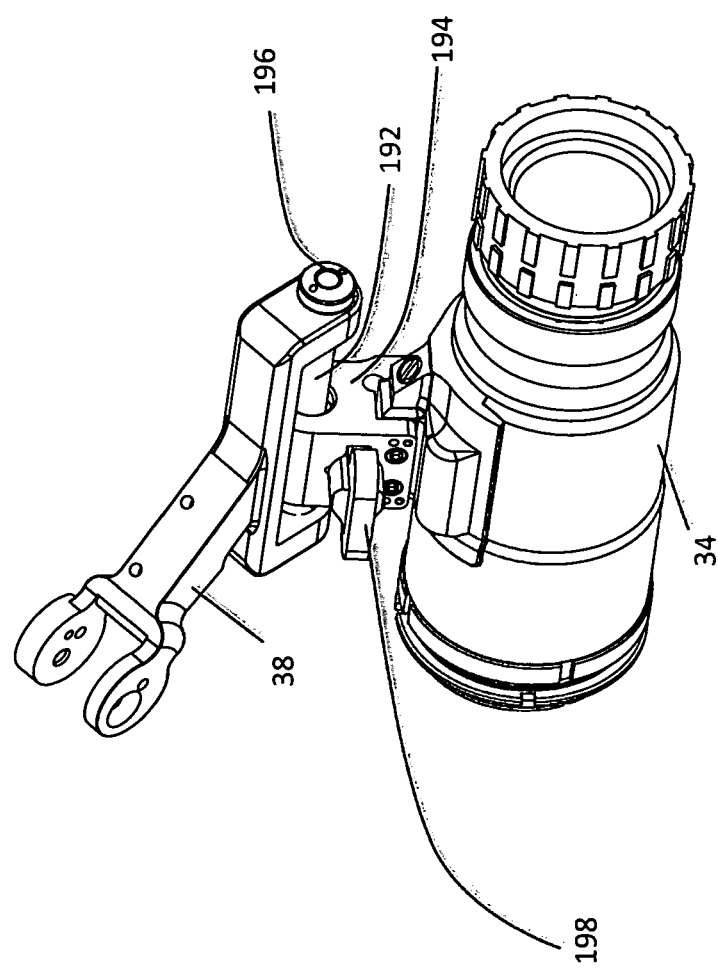
FIG. 21 is a schematic diagram illustrating fore, aft, and inter pupillary adjustment for a binocular system according to an embodiment of the system described herein.

Referring to FIG. 21, the monocular 34 is shown as being attached to the arm 38 using a rail 192 and a cam body 194. The arm 38 is attached to the rail 192 at an attachment point 196 that allows the rail 192 to rotate about the axis of the rail 192 to adjust the inter pupillary distance between the monocular 34 and the monocular 32 (not shown in FIG. 21). As described in more detail elsewhere herein, the attachment point 196 may include frictional elements that maintain the position of the rail 192 following rotation of the rail 192. A user can exert force on the monocular 34 to place the monocular 34 in a particular position. The monocular 34 may then maintain the position until the user exerts force again.

The cam body 194 includes a cam lever 198 that facilitates fore and aft adjustment of the monocular 34. When the cam lever 198 is turned to a first position, fore and aft movement of the monocular 34 is inhibited. When the cam lever 198 is turned to a second position, different from the first position, the monocular 34 may be moved fore and aft. Operation of the cam lever 198 and corresponding mechanism is described in more detail elsewhere herein. Note that fore and aft movement of the monocular 34 is independent of adjustment of the inter pupillary adjustment by rotating the monocular 34 about the rail 192.

Figure 22:
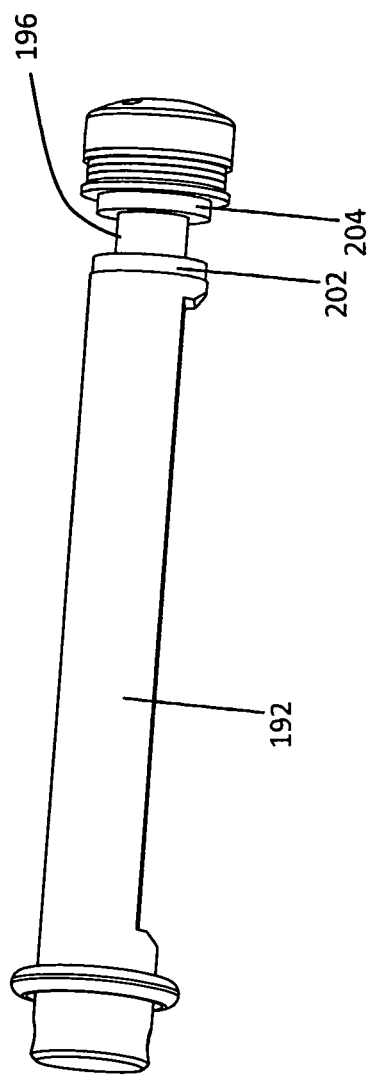
FIG. 22 is a schematic diagram illustrating in detail inter pupillary adjustment for a binocular system according to an embodiment of the system described herein.

Referring to FIG. 22, the rail 192 is shown in more detail as including a first plastic washer 202 and a second plastic washer 204. The plastic washers 202, 204 engage the arm 38 (not shown in FIG. 22) at the attachment point 196 (not shown in FIG. 22). The plastic washers 202, 204 provide frictional resistance to rotation of the rail 192 about its axis to maintain the monocular 34 (not shown in FIG. 22) in a position set by a user. Note that a similar mechanism may be used for the monocular 32 (not shown in FIG. 22). Note that any other suitable material may be used for the washers 202, 204.

Figure 23:
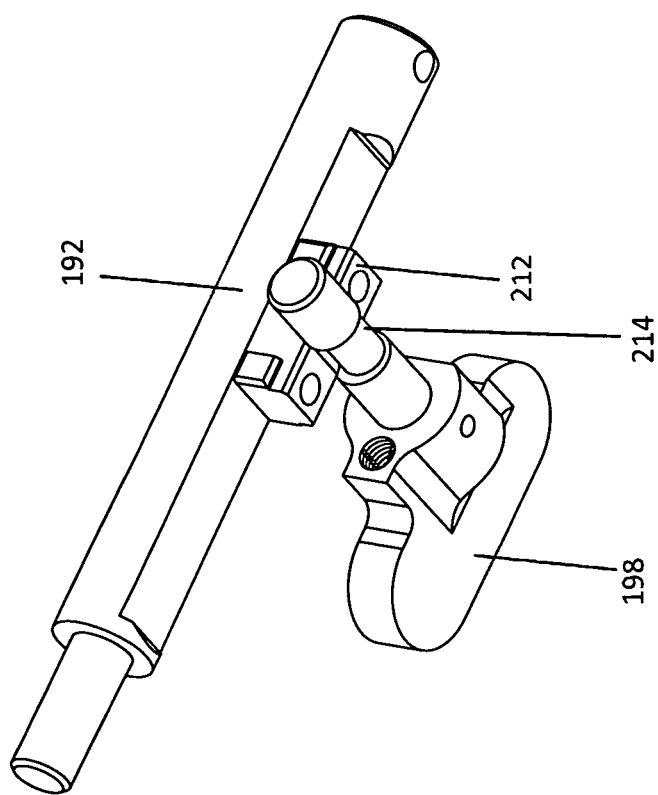
FIG. 23 is a schematic diagram illustrating in detail fore and aft adjustment for a binocular system according to an embodiment of the system described herein.

Referring to FIG. 23, the rail 192 and the cam lever 198 are shown without the cam block 194. A plate locking slide 212 frictionally engages the rail 192 so that, when the plate locking slide 212 is urged toward the rail 192, fore and aft motion of the monocular 34 is inhibited.

The cam lever 198 is attached to a cam shaft locking slide 214 so that rotation of the cam lever 198 causes rotation of the cam shaft locking slide 214. The cam shaft locking slide 214 includes an inner part having a smaller diameter than two outer parts. The two outer parts rotate within bearings of the cam body 194 (not shown in FIG. 23) about an axis of the outer parts. The inner part rotates about an axis that is not coaxial with the axis of the two outer parts. Thus, rotation of the cam lever 198 causes the inner part to urge plate locking slide toward or away from the rail 192. A user turns the cam lever 198 in one direction to lock the fore and aft movement of the monocular 34 and turns the cam lever 198 in another direction to release the monocular 34 for fore and aft movement.

As mentioned elsewhere herein, it is useful to provide collimation of the monoculars 32, 34 to avoid double vision and/or headaches and stress that result from viewing non-collimated stereoscopic images. In an embodiment herein, the monoculars 32, 34 are collimated to less than one degree of convergence and less than 0.3 degrees of dipvergence/divergence. Note that all of the movements for the monoculars 32, 34 provided herein maintain the collimation of the monoculars. Thus, for example, the monoculars 32, 34 may be moved fore and aft using the plate locking slide 212 which frictionally engages the rail 192 without changing the collimation therebetween. In addition, the monoculars 32, 34 may be moved side to side (changing the inter-pupilary distance) using the rail 192 and the washers 202, 204 without changing the collimation therebetween. Similarly, the monoculars 32, 34 may (also) be tilted and/or lifted without changing the collimation therebetween. Optical collimation may be provided using any appropriate mechanism, such as set screws (not shown) provided in the base plate 62 under the arms 36 and 38 between the hinges 44, 46 and any electrical connectors that are adjusted to move the monoculars 32, 34 independently in one dimension. In addition, the monoculars 32, 34 may be independently tilted up or down by providing adjustment in another dimension. It is also possible to add shim components to ensure good collimation.

Note that each monocular may be individually wired. The compartment 132 (discussed above) may supply each of the monocular 32, 34 with power for image intensifier tube (nominal 2.5 VDC) and provides a signal for "Low Power Indicator" and "IR On Indicator". In an embodiment herein, the "Low Power Indicator" signal may be provided when battery voltage drops below certain level while the "IR On Indicator" signal may be provided when infrared illumination is activated.

Figure 24:
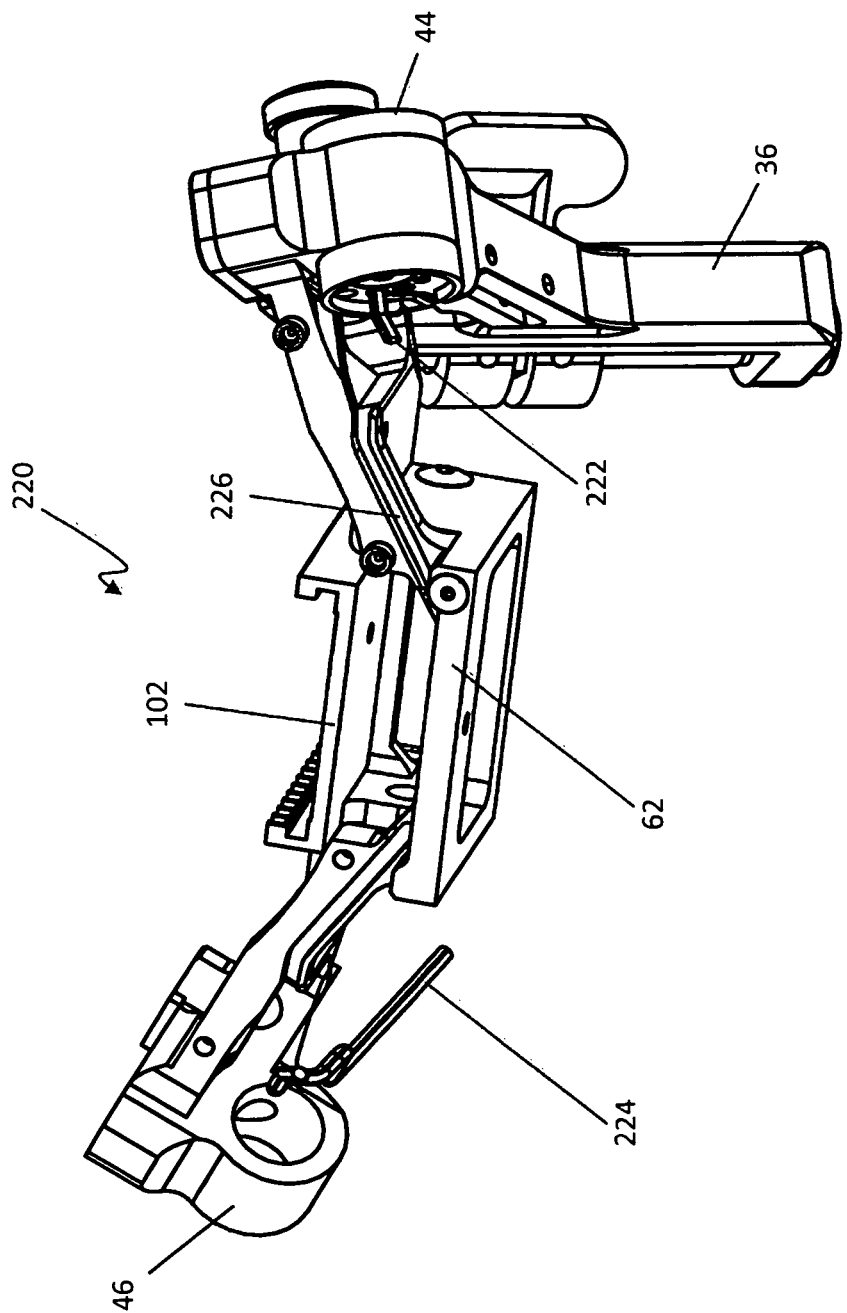
FIG. 24 is a schematic diagram illustrating wiring for a binocular system according to an embodiment of the system described herein.

Referring to FIG. 24, a diagram 220 shows the base plate 62 and the tilt base 102 as well as the hinges 44, 46 and the arm 36. A portion of a first cable 222 is shown in the diagram 220. The first cable 222 passes around the hinge 44 within the arm 36. Similarly, a second cable 224 passes through the hinge 46. Note that having a centrally located entry point allows minimization of the bending action on the cables 222, 224. When the arm 36 and the other arm 38 (not shown in FIG. 24) are moved up and down, the cables 222, 224 twist about their own axes close to 180 degrees.

In an embodiment herein, the first cable 222 makes an electrical connection between the monocular 32 (not shown in FIG. 24) and the compartment 132 that contains the electronics (not shown in FIG. 24). The first cable 222 may be placed in a grove 226 that is part of the tilt base 102. The second cable 224 electrically couples the second monocular 34 (not shown in FIG. 24) with the compartment 132 that contains the electronics (not shown in FIG. 24).

The cable covers 156, 158, which are discussed above in connection with FIG. 19, are not shown in FIG. 24. The first cable cover 156 covers the portion of the first cable 222 between the hinge 44 and the compartment 132, including the portion of the first cable 222 in the grove 226. Similarly, the second cable cover 158 covers the portion of the second cable 224 between the hinge 46 and the compartment 132.

Figure 25:
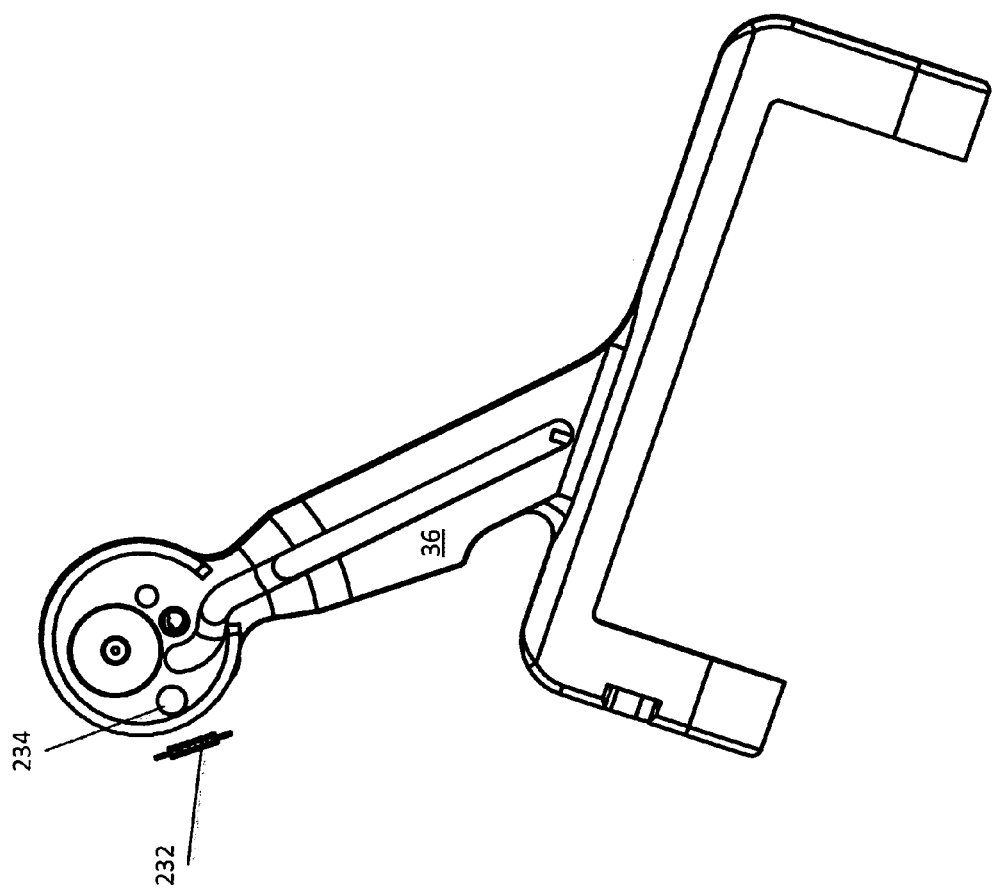
FIG. 25 is a schematic diagram illustrating a reed switch for a binocular system according to an embodiment of the system described herein.

Referring to FIG. 25, the arm 36 is shown with a reed switch (magnetic switch) 232 in proximity thereof. In an embodiment herein, the reed switch 232 may be placed inside a hollow portion of the base plate 62 (not shown in FIG. 25) and be electrically connected to provide electrical signals to electronics within the compartment 132 (not shown in FIG. 25). The arm 36 includes a magnet 234 that aligns with the reed switch 232 when the corresponding monocular 32 is in use (deployed). The reed switch 232 opens (becomes electrically disconnected) when the magnet 234 moves away from the reed switch 232 with movement of the arm 36. In an embodiment herein, the reed switch 232 provides different electrical signals (open or closed) depending upon whether the magnet 234 is aligned with the reed switch 232.

When a user raises the monocular 32 to the stowed (unused) position, the electronics of the compartment 132 shut down all power to monocular 32 shuts down. When a user lowers the monocular 32 to the used (deployed) position, the electronics of the compartment 132 provide power to monocular 32. Note that a similar mechanism may also be used with the monocular 34.

The system described herein may be implemented using the hardware described herein, variations thereof, or any other appropriate hardware capable of providing the functionality described herein. Thus, for example, the specific mechanical components illustrated herein may be replaced with similar components that provide appropriate functionality. It is also possible to provide additional components without departing from the spirit and scope of the invention. Such additional components include a compass mounted on the system 30 that provides a visual directional indication through one or both of the monoculars 32, 34 and/or possibly a clip-on thermal imager.

While the invention has been disclosed in connection with various embodiments, modifications thereon will be readily apparent to those skilled in the art. Accordingly, the spirit and scope of the invention is set forth in the following claims.

What is claimed is:

1. A binocular system, comprising:
   a first monocular;
   a second monocular;
   a first arm coupled to a base plate via a first hinge and coupled to the first monocular; and
   a second arm coupled to the base plate via a second hinge and coupled to the second monocular, wherein each of the monoculars rotates about a corresponding one of the hinges to increase a transverse distance between the monoculars in an unused state and along an axis of rotation of each of the hinges that is not parallel to an axis of collimation of each of the monoculars, wherein the monoculars are collimated to less than one degree of convergence and less than 0.3 degrees of dipvergence/divergence when rotated into a deployed position, and wherein, in the deployed position, the monoculars are movable without changing the collimation therebetween.

2. A binocular system, according to claim 1, further comprising:
   a mounting bracket coupled to the base plate;
   a tilt base, interposed between the mounting bracket and the base plate; and
   a tilt lever, having a cam that is operatively engaged with the tilt base, wherein actuation of the lever causes the base plate to tilt with respect to the mounting bracket.

3. A binocular system, according to claim 2, wherein tilting the monoculars does not change collimation thereof when deployed.

4. A binocular system, according to claim 1, further comprising:
   a mounting bracket coupled to the base plate;
   a tilt base, interposed between the mounting bracket and the base plate, the tilt base having notches therein;
   a height adjustment lever having a portion that engages the notches of the tilt base; and
   a spring that urges the height adjustment lever toward the notches, wherein disengaging the height adjustment lever from the notches allows for the height of the monoculars to be adjusted.

5. A binocular system, according to claim 1, wherein rotating each of the monoculars about a corresponding hinge thereof causes each of the monoculars to be in an unused position.

6. A binocular system, according to claim 5, wherein the system is mounted on a helmet.

7. A binocular system, according to claim 6, wherein each of the monoculars placed in an unused position is maintained below the top of the helmet.

8. A binocular system, according to claim 5, further comprising:
   a first button provided on the first arm, wherein the first button locks the first arm in at least one of: a deployed position and an unused position; and
   a second button provided on the second arm, wherein the second button locks the second arm in at least one of: a deployed position and an unused position.

9. A binocular system, according to claim 8, wherein each of the first and second buttons includes a button cam attached thereto, wherein the button cam urges a ball into a detent that is part of a corresponding one of the hinges.

10. A binocular system, according to claim 1, further comprising:
    a first rail coupled to the first arm;
    a second rail coupled to the second arm;
    a first cam body attached to the first rail and to the first monocular;
    a first cam lever within the first cam body that causes a first slide block to frictionally engage the first rail;
    a second cam body attached to the second cam rail and to the second monocular; and
    a second cam lever within the second cam body that causes a second slide block to frictionally engage the second rail, wherein each of the rails rotates in a corresponding one of the arms to adjust inter pupillary distance for the monoculars independently of adjusting fore and aft positions of the monoculars by frictionally disengaging and then engaging the slide blocks using the cam levers.

11. A binocular system, according to claim 10, wherein each of the rails has a flat portion that frictionally engages a corresponding one of the slide blocks.

12. A binocular system, according to claim 10, further comprising:
    at least one plastic washer, interposed between one of the rails and a corresponding one of the arms.

13. A binocular system, according to claim 1, further comprising:
    a battery compartment;
    a rotary switch; and
    an electronics compartment, coupled to at least one of: the battery compartment and the rotary switch, wherein the electronics compartment contains electronics that provide electrical signals to the monoculars.

14. A binocular system, according to claim 13, further comprising:
    a first cable that provides electrical connection between the first monocular and the electronics compartment; and
    a second cable that provides electrical connection between the second monocular and the electronics compartment, wherein the cables pass through corresponding ones of the hinges.

15. A binocular system, according to claim 13, further comprising:
    a first reed switch that senses a magnet in the first arm; and
    a second reed switch that senses a magnet in the second arm.

16. A binocular system, according to claim 15, wherein rotating each of the monoculars about a corresponding hinge thereof causes each of the monoculars to be in an unused position and wherein the reed switches provide signals to the electronics indicating a position of a corresponding one of the arms.

17. A binocular system, according to claim 1, further comprising:
    an external source, coupled to the binocular system, that provides an electronic signal thereto.

18. A binocular system, according to claim 17, wherein the electronic signal is a thermal image signal.

19. A binocular system, according to claim 18, wherein the thermal image signal is superimposed on a visual image provided by one of the monoculars.

20. A binocular system, according to claim 19, wherein the thermal image signal replaces a visual image provided by one of the monoculars.

* * * * *